US011483488B2

(12) United States Patent
Miyata et al.

(10) Patent No.: US 11,483,488 B2
(45) Date of Patent: Oct. 25, 2022

(54) IMAGING APPARATUS, INTER-EXPOSURE ZOOM IMAGING METHOD, PROGRAM, AND RECORDING MEDIUM

(71) Applicant: FUJIFILM Corporation, Tokyo (JP)

(72) Inventors: Masahiko Miyata, Saitama (JP); Yuki Sugihara, Saitama (JP); Masaru Kobayashi, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 89 days.

(21) Appl. No.: 17/025,775

(22) Filed: Sep. 18, 2020

(65) Prior Publication Data

US 2021/0006702 A1 Jan. 7, 2021

Related U.S. Application Data

(63) Continuation of application No. PCT/JP2019/009475, filed on Mar. 8, 2019.

(30) Foreign Application Priority Data

Mar. 19, 2018 (JP) ............................ JP2018-051413

(51) Int. Cl.
*H04N 5/235* (2006.01)
*H04N 5/225* (2006.01)
(Continued)

(52) U.S. Cl.
CPC ............ *H04N 5/2353* (2013.01); *G03B 5/00* (2013.01); *G03B 13/36* (2013.01); *G03B 17/14* (2013.01);
(Continued)

(58) Field of Classification Search
CPC .... H04N 5/2353; H04N 5/22525; H04N 5/76; H04N 5/23245; H04N 5/23296;
(Continued)

(56) References Cited

U.S. PATENT DOCUMENTS 4,731,629 A * 3/1988 Aoshima .................. G02B 7/10 396/85
5,134,432 A * 7/1992 Kohmoto ............... G03B 7/097 396/76
(Continued)

FOREIGN PATENT DOCUMENTS

CN 102055907 A 5/2011
CN 103080829 A 5/2013
(Continued)

OTHER PUBLICATIONS

JP-2010200243-A Machine Translation (Year: 2010).*
(Continued)

*Primary Examiner* — Jason A Flohre
(74) *Attorney, Agent, or Firm* — Birch, Stewart, Kolasch & Birch, LLP

(57) ABSTRACT

Provided is an imaging apparatus, an inter-exposure zoom imaging method, a program, and a recording medium capable of performing inter-exposure zoom imaging as intended by a user. The inter-exposure zoom imaging method according to the embodiment of the present invention includes a step of setting an imaging mode of inter-exposure zoom imaging by an imaging mode setting unit; a step S14 of setting an end angle of view of the inter-exposure zoom imaging by an end angle of view setting unit; and a step S26 of starting exposure in an imaging element of the inter-exposure zoom imaging (step S18 and step S20) in a case where the imaging mode and the end angle of view of the inter-exposure zoom imaging are set and an imaging instruction is received, and ending the exposure in the imaging element of the inter-exposure zoom imaging at least in a case where an angle of view of a zoom lens zoomed by a manual operation reaches the set end angle of view (step S24), by an exposure controller.

17 Claims, 12 Drawing Sheets

(51) Int. Cl.

| | |
|---|---|
| ***G03B 5/00*** | (2021.01) |
| ***G03B 13/36*** | (2021.01) |
| ***G03B 17/14*** | (2021.01) |
| ***H04N 5/76*** | (2006.01) |

(52) U.S. Cl.
CPC ........... *H04N 5/22525* (2018.08); *H04N 5/76* (2013.01); *G03B 2205/0046* (2013.01)

(58) Field of Classification Search
CPC .... H04N 5/2352; H04N 5/772; H04N 9/8205; H04N 5/232939; H04N 5/23209; H04N 5/262; G03B 5/00; G03B 13/36; G03B 17/14; G03B 2205/0046; G03B 15/00; G03B 15/08–16
See application file for complete search history.

(56) References Cited

U.S. PATENT DOCUMENTS

| | | | | | |
|---|---|---|---|---|---|
| 5,305,049 | A * | 4/1994 | Miyazaki | G03B 17/38 | 396/246 |
| 5,331,367 | A * | 7/1994 | Kawasaki | G03B 3/10 | 396/77 |
| 5,654,789 | A * | 8/1997 | Kirigaya | G02B 7/102 | 396/85 |
| 2010/0188533 | A1* | 7/2010 | Maniwa | G03B 13/36 | 348/240.99 |
| 2011/0109786 | A1 | 5/2011 | Kimura | | |
| 2013/0120618 | A1* | 5/2013 | Wang | H04N 5/23296 | 348/240.99 |
| 2014/0362258 | A1* | 12/2014 | Ichikawa | H04N 5/23229 | 348/240.1 |
| 2016/0191819 | A1* | 6/2016 | Sakai | G06F 3/0488 | 348/333.12 |
| 2016/0234444 | A1* | 8/2016 | Hosono | H04N 5/2351 | |
| 2016/0316152 | A1* | 10/2016 | Pit Rada | G06T 5/20 | |

FOREIGN PATENT DOCUMENTS

| | | | | |
|---|---|---|---|---|
| JP | 3-236026 | A | | 10/1991 |
| JP | 6-332024 | A | | 12/1994 |
| JP | 2010-45586 | A | | 2/2010 |
| JP | 2010-176092 | A | | 8/2010 |
| JP | 2010200243 | A | * | 9/2010 |
| JP | 2013-34167 | A | | 2/2013 |
| JP | 2018-14680 | A | | 1/2018 |

OTHER PUBLICATIONS

English translation of the International Preliminary Report on Patentability (form PCT/IPEA/409), with a completion date of Sep. 2, 2019, for corresponding International Application No. PCT/JP2019/009475.

International Search Report (form PCT/ISA/210), dated May 14, 2019, for corresponding International Application No. PCT/JP2019/009475, with an English translation.

Chinese Office Action and Search Report for corresponding Chinese Application No. 201980014980.1, dated May 6, 2021, with an English translation.

* cited by examiner

IMAGING APPARATUS, INTER-EXPOSURE ZOOM IMAGING METHOD, PROGRAM, AND RECORDING MEDIUM

CROSS-REFERENCE TO RELATED APPLICATIONS

The present application is a Continuation of PCT International Application No. PCT/JP2019/009475 filed on Mar. 8, 2019 claiming priority under 35 U.S.C. § 119(a) to Japanese Patent Application No. 2018-051413 filed on Mar. 19, 2018. Each of the above applications is hereby expressly incorporated by reference, in its entirety, into the present application.

BACKGROUND OF THE INVENTION

1. Field of the Invention

The present invention relates to an imaging apparatus, an inter-exposure zoom imaging method, a program, and a recording medium, and more particularly to a technique for performing inter-exposure zoom imaging as intended by a user.

2. Description of the Related Art

Conventionally, as one of imaging methods using a zoom lens, inter-exposure zoom imaging in which the zoom lens is zoomed during long-time exposure is known. In an image captured by the inter-exposure zoom imaging, the image flows radially from the center of the image toward the periphery, and a feeling of a dynamic feeling and a special effect are obtained in the entire image.

The camera disclosed in JP1994-332024A (JP-H06-332024A) is a camera comprising a stepwise inter-exposure zoom apparatus capable of performing inter-exposure zoom imaging, and is characterized by performing inter-exposure zoom imaging (stepwise inter-exposure zoom imaging) of a plurality of images having different zoom speeds.

In the camera disclosed in JP1994-332024A (JP-H06-332024A), in order to perform the stepwise inter-exposure zoom imaging, a zoom lens (power zoom lens) is returned to a zoom position before a first inter-exposure zoom imaging in a case where the first inter-exposure zoom imaging is ended. Subsequently, after winding of a film and charging of a mechanical shutter are completed, and the next imaging becomes possible, a second inter-exposure zoom imaging is performed at different zoom speeds, and this is repeated according to the necessary number of stages of the stepwise inter-exposure zoom imaging.

A current focal length detected by a focal length detection unit before the start of the first inter-exposure zoom is stored in a memory as an exposure start focal length, and after the end of the first inter-exposure zoom imaging, between exposures of the first sheet, the zoom lens is returned and driven by a power zoom until the focal length of the zoom lens becomes the exposure start focal length stored in the memory. As a result, the focal length is automatically returned to the exposure start focal length at the time of starting the first inter-exposure zoom at the time of inter-exposure zoom imaging of the second and subsequent images.

Further, paragraph [0044] of JP1994-332024A (JP-H06-332024A) discloses that "in a case where data inputted from a body 10 is a zoom operation instruction, it is checked whether or not it is zooming up to a specified focal length, and in a case where it is the specified zooming, focal length data inputted from a zoom code plate 71 is checked (S415, S417, and S419). In a case where the inputted current focal length is not a specified focal length, a zoom speed is checked and a zoom motor 65 is driven in a specified focal length direction at a specified speed (S419, S423 to S431). (omission) In a case where the current focal length input from the zoom code plate 71 reaches the specified focal length, the zoom motor 65 is stopped (S411, S415 to S421).".

SUMMARY OF THE INVENTION

In the inter-exposure zoom imaging, an amount of change in an angle of view (start angle of view) at which the exposure is started and an amount of change in an angle of view (end angle of view) at which the exposure is ended becomes important as an important factor determining the zoom effect.

However, in a current imaging apparatus having a zoom lens that is zoomed by a manual operation, it is possible to determine the start angle of view of inter-exposure zoom imaging, but since the end angle of view cannot be determined, in order to obtain a desired zoom effect, there is a problem that investigation and setting of an optimum imaging condition (mainly exposure time) and a technique of a photographer (managing the speed of turning a zoom ring) are required.

JP1994-332024A (JP-H06-332024A) discloses a single-lens reflex camera using a photographic film as an embodiment of a camera comprising the stepwise inter-exposure zoom apparatus. A camera body of the single-lens reflex camera determines whether a lens to be mounted is a power zoom lens or not, and enables the stepwise inter-exposure zoom only in a case where the lens is determined as the power zoom lens. This is because the invention disclosed in JP1994-332024A (JP-H06-332024A) is characterized by automatically returning to the exposure start focal length at the time of starting the first inter-exposure zoom in the case of performing the inter-exposure zoom imaging of the second and subsequent images.

Therefore, the invention disclosed in JP1994-332024A (JP-H06-332024A) cannot be applied to the imaging apparatus having the zoom lens that is zoomed by the manual operation.

Furthermore, according to the disclosure in paragraph [0044] of JP1994-332024A (JP-H06-332024A), it is suggested that the "specified focal length" corresponds to the "end angle of view" of the inter-exposure zoom imaging to stop the zoom motor in a case where the current focal length of the zoom lens reaches the "specified focal length" during the inter-exposure zoom imaging. However, regarding "specified focal length", there is no disclosure other than paragraph [0044] of JP1994-332024A (JP-H06-332024A), and there is also no disclosure how "specified focal length" is specified.

The present invention has been made in view of the above circumstances, and an object of the present invention is to provide an imaging apparatus, an inter-exposure zoom imaging method, a program, and a recording medium capable of performing the inter-exposure zoom imaging as intended by the user in a case where performing the inter-exposure zoom imaging in which the zoom lens is zoomed by the manual operation during long-time exposure.

In order to achieve the above object, an imaging apparatus according to an aspect of the present invention comprises: an imaging mode setting unit that sets an imaging mode of inter-exposure zoom imaging; an end angle of view setting unit that sets an end angle of view of the inter-exposure zoom imaging; and an exposure controller that starts exposure in an imaging element of the inter-exposure zoom imaging in a case where the imaging mode and the end angle of view of the inter-exposure zoom imaging are set and an imaging instruction is received, and ends the exposure in the imaging element of the inter-exposure zoom imaging at least in a case where an angle of view of a zoom lens zoomed by a manual operation reaches the set end angle of view.

A start angle of view (an image of the start angle of view) at which the inter-exposure zoom imaging is started can be checked, for example, by displaying an image (a live view image) read from the imaging element on a monitor. On the other hand, an end angle of view (an image of the end angle of view) at which the inter-exposure zoom imaging is ended cannot be checked by the live view image. This is because the image is not read from the imaging element during the inter-exposure zoom imaging.

According to one aspect of the present invention, the end angle of view of the inter-exposure zoom imaging is set by the end angle of view setting unit before the inter-exposure zoom imaging. In the case of setting the end angle of view, the user can check the end angle of view (the image of the end angle of view) by, for example, performing a zooming operation of a zoom lens to display an image corresponding to the end angle of view on a monitor as a live view image.

Preparation for the inter-exposure zoom imaging is completed by performing the zooming operation of the zoom lens to the start angle of view at which the inter-exposure zoom imaging is started after setting the end angle of view of the inter-exposure zoom imaging. After that, the inter-exposure zoom imaging can be started by an imaging instruction input and the zoom operation of the zoom lens by the manual operation. Then, in a case where the angle of view of the zoom lens zoomed by the manual operation reaches the end angle of view, the exposure controller ends the inter-exposure zoom imaging. The user may perform the zooming operation of the zoom lens beyond an exposure time in the inter-exposure zoom imaging without being conscious of the end angle of view of the inter-exposure zoom imaging, and in a case where the angle of view of the zoom lens reaches the end angle of view, the exposure controller ends the inter-exposure zoom imaging regardless of the zoom operation of the zoom lens by the user. Thereby, the start angle of view and the end angle of view of the image captured by the inter-exposure zoom imaging can be set to the angle of view as intended by the user, and the inter-exposure zoom imaging can be performed as intended by the user.

It is preferable that the imaging apparatus according to another aspect of the present invention comprises: a target exposure time setting unit that sets a target exposure time in the inter-exposure zoom imaging; and an exposure time priority mode setting unit that sets an exposure time priority mode in which an exposure time in the inter-exposure zoom imaging is prioritized over the end angle of view, in which the exposure controller ends the exposure of the inter-exposure zoom imaging in a case where the exposure time priority mode is set and the exposure time in the inter-exposure zoom imaging reaches the target exposure time before the angle of view of the zoom lens zoomed by the manual operation reaches the end angle of view.

According to another aspect of the present invention, in a case where speed of an angle of view variation of the zoom lens by the zoom operation of the user is slower than an ideal angle of view variation of the zoom lens with respect to the set target exposure time, the angle of view of the zoom lens reaches the target exposure time before reaching the end angle of view, and the inter-exposure zoom imaging can be ended.

It is preferable that the imaging apparatus according to another aspect of the present invention comprises: an automatic exposure controller that sets an exposure control parameter other than the target exposure time in a case where the inter-exposure zoom imaging is performed on the basis of the target exposure time set by the target exposure time setting unit and brightness of a subject obtained at a start angle of view and the end angle of view of the inter-exposure zoom imaging, and controls exposure during the inter-exposure zoom imaging with the set exposure control parameter. Since the exposure during the inter-exposure zoom imaging is controlled by the set exposure control parameter, in the case where the speed of the angle of view variation of the zoom lens by the zoom operation of the user is slower than the ideal angle of view variation, the inter-exposure zoom imaging is ended by reaching the target exposure time before the angle of view of the zoom lens reaches the end angle of view, and thus it is possible to prevent overexposure of the image captured by the inter-exposure zoom imaging.

It is preferable that the imaging apparatus according to another aspect of the present invention comprises: a recording unit that records an image captured by the inter-exposure zoom imaging on a recording medium, in which the recording unit records information indicating that the exposure of the inter-exposure zoom imaging ends before the angle of view of the zoom lens reaches the end angle of view on the recording medium in association with the image captured by the inter-exposure zoom imaging in a case where the exposure time in the inter-exposure zoom imaging reaches the target exposure time and the exposure of the inter-exposure zoom imaging ends before the angle of view of the zoom lens reaches the end angle of view.

In a case where the speed of the angle of view variation of the zoom lens by the zoom operation of the user is faster than the ideal angle of view variation, the angle of view of the zoom lens reaches the end angle of view before the desired exposure time in the inter-exposure zoom imaging, and the inter-exposure zoom imaging is ended, and thus the image captured by the inter-exposure zoom imaging is underexposed. Therefore, in a case where the exposure of the inter-exposure zoom imaging is ended before the end angle of view is reached, information indicating this is recorded on the recording medium in association with the image captured by the inter-exposure zoom imaging, and thereby it is found that the image captured by the inter-exposure zoom imaging is underexposed than a proper exposure.

It is preferable that the imaging apparatus according to another aspect of the present invention comprises: a recording unit that records an image captured by the inter-exposure zoom imaging on a recording medium, in which the recording unit records the target exposure time and an actual exposure time, a ratio of the target exposure time and the actual exposure time, or a difference between the target exposure time and the actual exposure time on the recording medium in association with the image captured by the inter-exposure zoom imaging in a case where the angle of view of the zoom lens reaches the end angle of view before the exposure time in the inter-exposure zoom imaging reaches the target exposure time, and the exposure of the inter-exposure zoom imaging ends.

It can be seen that the image captured by the inter-exposure zoom imaging is underexposed than the proper exposure and it can be used for gain correction to make the underexposed image have brightness corresponding to the proper exposure by recording the target exposure time and the actual exposure time, a ratio of the target exposure time and the actual exposure time, or a difference between the target exposure time and the actual exposure time on the recording medium in association with the image captured by the inter-exposure zoom imaging in a case where the speed of the angle of view variation of the zoom lens by the zoom operation of the user is faster than the ideal angle of view variation, and the exposure of the inter-exposure zoom imaging is ended before the end angle of view is reached.

It is preferable that the imaging apparatus according to another aspect of the present invention comprises: an image processing unit that performs processing of multiplying an image captured by the inter-exposure zoom imaging by a gain which is determined by a ratio of the target exposure time and an actual exposure time or a difference between the target exposure time and the actual exposure time in a case where the angle of view of the zoom lens reaches the end angle of view before the exposure time in the inter-exposure zoom imaging reaches the target exposure time, and the exposure of the inter-exposure zoom imaging ends.

Although the image captured by the inter-exposure zoom imaging is underexposed than the proper exposure in the case where the speed of the angle of view variation of the zoom lens by the zoom operation of the user is faster than the ideal angle of view variation, and the exposure of the inter-exposure zoom imaging is ended before the end angle of view is reached, the underexposed image can be corrected to the brightness corresponding to the proper exposure by applying the gain determined by the ratio of the target exposure time and the actual exposure time to the image captured by the inter-exposure zoom imaging.

It is preferable that the imaging apparatus according to another aspect of the present invention comprises: a display unit; and a display controller that causes the display unit to display the information indicating that the exposure of the inter-exposure zoom imaging ends before the angle of view of the zoom lens reaches the end angle of view in the case where the exposure time in the inter-exposure zoom imaging reaches the target exposure time and the exposure of the inter-exposure zoom imaging ends before the angle of view of the zoom lens reaches the end angle of view.

It is found that the inter-exposure zoom imaging as intended by the user cannot be performed by displaying the information indicating that the exposure of the inter-exposure zoom imaging is ended before the end angle of view is reached on the display unit. As a result, the user can redo the inter-exposure zoom imaging.

It is preferable that the imaging apparatus according to another aspect of the present invention comprises: a target exposure time setting unit that sets a target exposure time in the inter-exposure zoom imaging; a display unit; and a display controller that causes the display unit to display information indicating a relationship between a current exposure time with respect to the target exposure time and a current angle of view with respect to the end angle of view of the inter-exposure zoom imaging during the inter-exposure zoom imaging.

The user can adjust the speed of the angle of view variation of the zoom lens while observing the information displayed on the display unit, and can set the angle of view of the zoom lens to the end angle of view in a case where the exposure time reaches the target exposure time.

It is preferable that in the imaging apparatus according to another aspect of the present invention, the display controller displays, on a screen of the display unit, a two-dimensional coordinate having a first axis indicating an elapsed time from an exposure start of the inter-exposure zoom imaging and a second axis indicating a change amount of the angle of view from a start angle of view of the inter-exposure zoom imaging and the target exposure time and the end angle of view on the two-dimensional coordinate and displays at least the current exposure time and the current angle of view on the two-dimensional coordinate.

The user can adjust the speed of the angle of view variation of the zoom lens while observing the target exposure time and the end angle of view and at least the current exposure time or the current angle of view on the two-dimensional coordinate displayed on the screen of the display unit, and can set the current angle of view of the zoom lens to the end angle of view in a case where the current exposure time reaches the target exposure time.

It is preferable that in the imaging apparatus according to another aspect of the present invention, the display controller further displays, on the two-dimensional coordinate displayed on the screen of the display unit, a graph indicating an ideal angle of view variation that causes the end angle of view in a state in which the target exposure time has elapsed.

The user can perform the zooming operation of the zoom lens such that the current angle of view and angle of view variation follow the graph while observing the graph indicating the ideal angle of view variation displayed on the screen of the display unit.

It is preferable that the imaging apparatus according to another aspect of the present invention comprises: an instruction unit that manually inputs an instruction to deform a shape of the graph, in which the display controller changes the shape of the graph displayed on the screen of the display unit according to the instruction from the instruction unit.

The user is not limited to a graph in which the angle of view changes linearly from the start angle of view and the angle of view varies (linearly Variation) to reach the end angle of view in a case where the target exposure time elapses, and can appropriately change the shape of the graph according to an instruction from the instruction unit. The user can perform the zooming operation of the zoom lens such that the current angle of view and angle of view variation follow the graph while observing the graph in which an angle of view variation speed is appropriately set.

It is preferable that in the imaging apparatus according to another aspect of the present invention, the exposure controller receives the imaging instruction in association with the zoom operation of the zoom lens and starts the exposure of the inter-exposure zoom imaging. It is complicated to simultaneously perform a shutter release operation for starting the inter-exposure zoom imaging and the zoom operation of the zoom lens, and it is difficult to perform the zooming operation of the zoom lens at a desired angle of view variation speed from the time of starting the inter-exposure zoom imaging. Therefore, for example, in the shutter release operation, the inter-exposure zoom imaging can be started without starting the inter-exposure zoom imaging, by receiving an imaging instruction in association with the zoom operation of the zoom lens thereafter. In this case, the user can start the inter-exposure zoom imaging by performing the zooming operation of the zoom lens, and does not need to perform the shutter release operation simultaneously with the zoom operation of the zoom lens.

It is preferable that the imaging apparatus according to another aspect of the present invention comprises: a zoom operation detection unit that detects the zoom operation of the zoom lens, in which the exposure controller receives the imaging instruction by being triggered with detection of the zoom operation due to the zoom operation detection unit, and starts the exposure of the inter-exposure zoom imaging. For example, in the shutter release operation, the inter-exposure zoom imaging can be started without starting the inter-exposure zoom imaging in a case where the zoom operation of the zoom lens is detected by the zoom operation detection unit thereafter.

It is preferable that the imaging apparatus according to another aspect of the present invention comprises: a start angle of view setting unit that sets a start angle of view of the inter-exposure zoom imaging, in which the exposure controller receives the imaging instruction by being triggered with the angle of view of the zoom lens that has reached the set start angle of view, and starts the exposure of the inter-exposure zoom imaging.

Considering an acceleration period until the angle of view variation speed of the zoom lens reaches from zero to the desired angle of view variation speed, it is difficult to perform the zooming operation of the zoom lens at the desired angle of view variation speed from the time of starting the inter-exposure zoom imaging. Therefore, the start angle of view of the inter-exposure zoom imaging is set, and the inter-exposure zoom imaging is started by being triggered with the angle of view of the zoom lens that has reached the start angle of view without immediately starting the exposure even in a case where the zooming operation of the zoom lens is performed. Accordingly, the zooming operation of the zoom lens can be performed at the desired angle of view variation speed from the time point of starting the inter-exposure zoom imaging.

An inter-exposure zoom imaging method according to another aspect of the present invention includes a step of setting an imaging mode of inter-exposure zoom imaging by an imaging mode setting unit; a step of setting an end angle of view of the inter-exposure zoom imaging by an end angle of view setting unit; and a step of starting exposure in an imaging element of the inter-exposure zoom imaging in a case where the imaging mode and the end angle of view of the inter-exposure zoom imaging are set and an imaging instruction is received, and ending the exposure in the imaging element of the inter-exposure zoom imaging at least in a case where an angle of view of a zoom lens zoomed by a manual operation reaches the set end angle of view, by an exposure controller.

It is preferable that the inter-exposure zoom imaging method according to another aspect of the present invention includes: a step of setting a target exposure time in the inter-exposure zoom imaging by a target exposure time setting unit; and a step of setting an exposure time priority mode in which an exposure time in the inter-exposure zoom imaging is prioritized over the end angle of view, by an exposure time priority mode setting unit, in which in the step of ending the exposure, the exposure of the inter-exposure zoom imaging is ended in a case where the exposure time priority mode is set and the exposure time in the inter-exposure zoom imaging reaches the target exposure time before the angle of view of the zoom lens zoomed by the manual operation reaches the end angle of view.

It is preferable that the inter-exposure zoom imaging method according to another aspect of the present invention includes: a step of recording an image captured by the inter-exposure zoom imaging on a recording medium, by a recording unit, in which in the step of recording, information indicating that the exposure in the inter-exposure zoom imaging ends before the angle of view of the zoom lens reaches the end angle of view is recorded on the recording medium in association with the image captured by the inter-exposure zoom imaging in a case where the exposure time in the inter-exposure zoom imaging reaches the target exposure time and the exposure in the inter-exposure zoom imaging ends before the angle of view of the zoom lens reaches the end angle of view.

It is preferable that the inter-exposure zoom imaging method according to another aspect of the present invention includes: a step of causing a display unit to display the information indicating that the exposure of the inter-exposure zoom imaging ends before the angle of view reaches the end angle of view in the case where the exposure time in the inter-exposure zoom imaging reaches the target exposure time and the exposure of the inter-exposure zoom imaging ends before the angle of view of the zoom lens reaches the end angle of view, by a display controller.

It is preferable that the inter-exposure zoom imaging method according to another aspect of the present invention includes: a step of setting a target exposure time in the inter-exposure zoom imaging, by a target exposure time setting unit, and a step of causing a display unit to display information indicating a relationship between a current exposure time with respect to the target exposure time and a current angle of view with respect to the end angle of view of the inter-exposure zoom imaging during the inter-exposure zoom imaging, by a display controller.

A program according to further another aspect of the present invention is a program for causing a computer in an imaging apparatus to implement the above-described inter-exposure zoom imaging method.

A recording medium according to further another aspect of the present invention is a non-transitory computer-readable recording medium that stores a program for causing a computer in an imaging apparatus to implement the inter-exposure zoom imaging method.

According to the present invention, in the case of performing the inter-exposure zoom imaging in which the zoom lens is zoomed by the manual operation during long-time exposure, assuming that the angle of view of the zoom lens zoomed by the manual operation reaches the end angle of view, the inter-exposure zoom imaging is ended. Accordingly, the user may perform the zooming operation of the zoom lens beyond the exposure time in the inter-exposure zoom imaging without being conscious of the end angle of view of the inter-exposure zoom imaging, and thereby the start angle of view and the end angle of view of the image captured by the inter-exposure zoom imaging can be set to the angle of view as intended by the user, and the inter-exposure zoom imaging can be performed as intended by the user.

DESCRIPTION OF THE PREFERRED EMBODIMENTS

Hereinafter, preferred embodiments of an imaging apparatus, an inter-exposure zoom imaging method, a program, and a recording medium according to the embodiment of the present invention will be described with reference to the accompanying drawings.

<Appearance of Imaging Apparatus>

Figure 1:
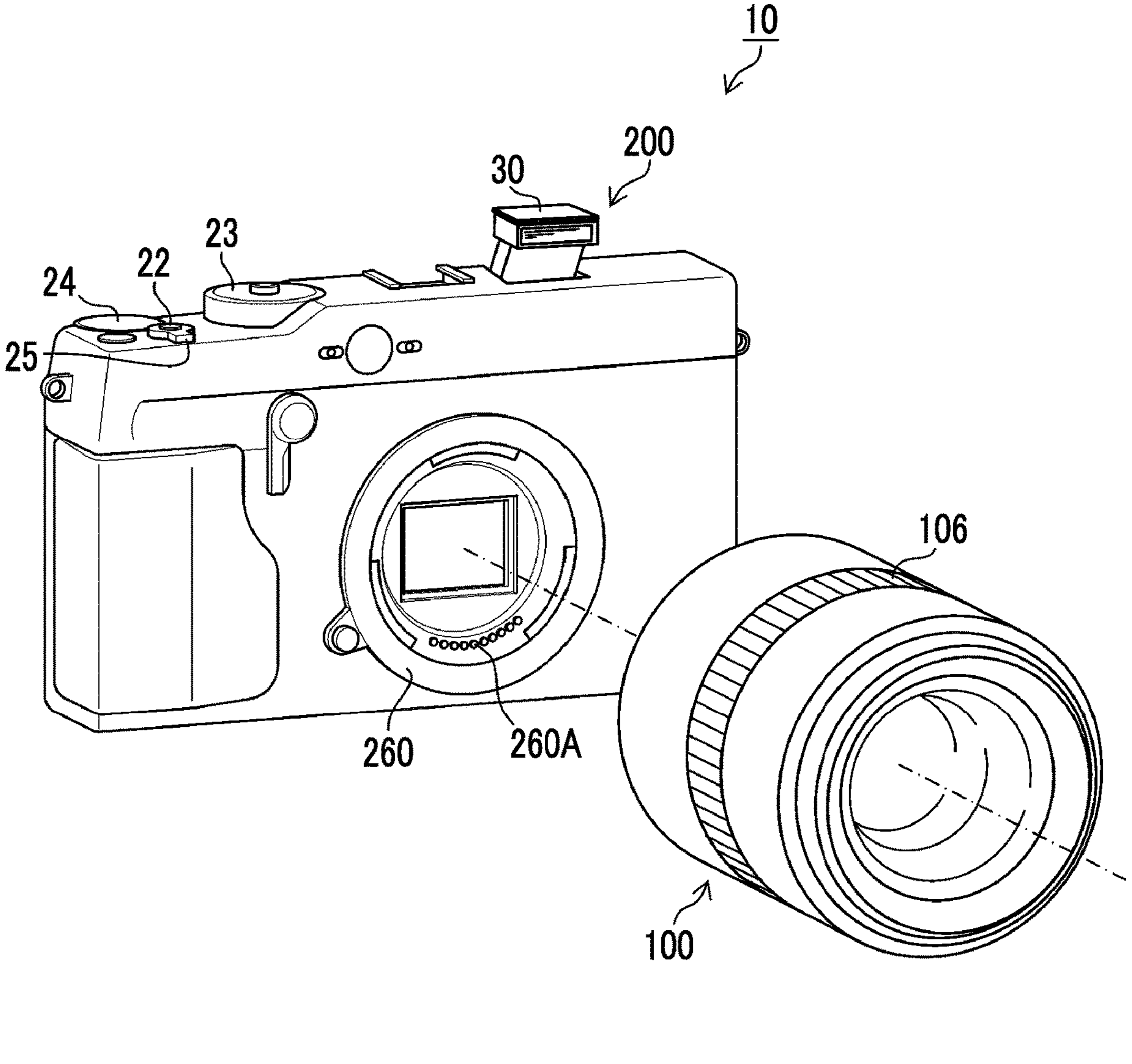
FIG. 1 is a perspective view of an imaging apparatus according to the present invention as seen obliquely from the front.
Figure 2:
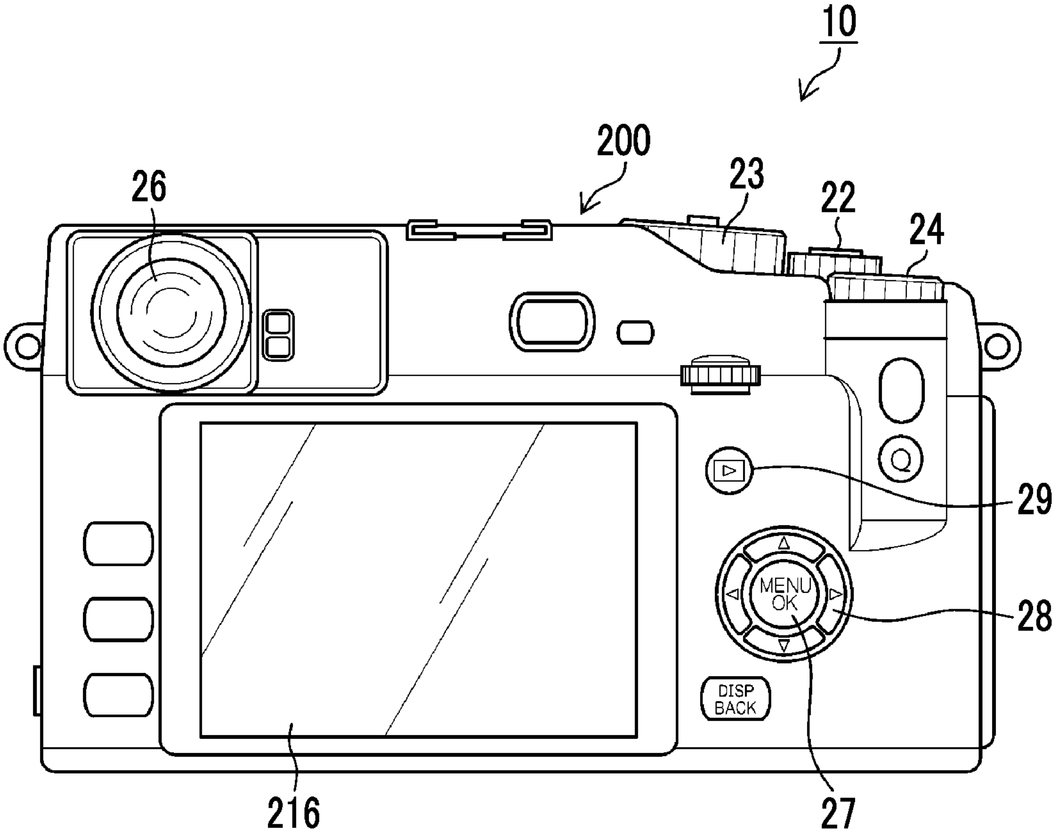
FIG. 2 is a rear view of the imaging apparatus.

FIG. 1 is a perspective view of the imaging apparatus according to the embodiment of the present invention as seen obliquely from the front, and FIG. 2 is a rear view of the imaging apparatus.

As shown in FIG. 1, an imaging apparatus 10 is a mirrorless digital single-lens camera composed of a zoom lens 100 as an interchangeable lens and a camera main body 200 to which the zoom lens 100 is detachably attached.

In FIG. 1, a main body mount 260 to which the zoom lens 100 is mounted is provided on a front surface of the camera main body 200, and a shutter release switch 22, a shutter speed dial 23, an exposure correction dial 24, a power supply lever 25, a built-in flash 30, and the like are mainly provided on an upper surface of the camera main body 200.

In addition, as shown in FIG. 2, a liquid crystal monitor 216, an electronic viewfinder 26, a MENU/OK key 27, a cross key 28, a play button 29, and the like are mainly provided on a rear surface of the camera main body 200.

The liquid crystal monitor 216 displays a live view image in an imaging mode, plays back and displays a captured image in a play mode, and also functions as a display unit that displays information used in a case where inter-exposure zoom imaging is performed and various menu screens. The MENU/OK key 27 is an operation key having a function as a menu button for instructing a display of a menu on a screen of the liquid crystal monitor 216 and a function as an OK button for instructing the determination and execution of a selected content. The cross key 28 is an operation unit that inputs instructions in four directions of up, down, left, and right, and functions as a multi-function key for selecting an item from the menu screen and instructing selection of various setting items from each menu. In addition, a left key and a right key of the cross key 28 function as frame advance (fast-forward and rewind) buttons in the play mode.

The MENU/OK key 27, the cross key 28 and the liquid crystal monitor 216 function as an imaging mode setting unit that sets various imaging modes including an imaging mode for performing the inter-exposure zoom imaging and a continuous imaging mode for continuously capturing still images in addition to a normal imaging mode for capturing one still image using an on-screen interactive method by using the menu screen displayed on the liquid crystal monitor 216.

Here, the inter-exposure zoom imaging is an imaging method for performing imaging by zooming the zoom lens 100 during a long-time exposure, and in a case where the imaging mode for performing the inter-exposure zoom imaging is set by the imaging mode setting unit, the inter-exposure zoom imaging method according to the embodiment of the present invention is performed.

The MENU/OK key 27, the cross key 28, and the liquid crystal monitor 216 function as, for example, an end angle of view setting unit that sets setting an end angle of view of the inter-exposure zoom imaging, a target exposure time setting unit that sets a target exposure time in the inter-exposure zoom imaging, an exposure time priority mode setting unit that sets an exposure time priority mode in which an exposure time in the inter-exposure zoom imaging is prioritized over the end angle of view, and a start angle of view setting unit that sets a start angle of the inter-exposure zoom imaging, by using the on-screen interactive method. Each of these functions will be described later.

The play button 29 is a button for switching to a play mode in which a still image or a motion picture recorded on the recording medium (a memory card 212 shown in FIG. 3) is displayed on the liquid crystal monitor 216.

The zoom lens 100 shown in FIG. 1 is manufactured in accordance with a communication standard of the camera main body 200, and can communicate with the camera main body 200. In addition, the zoom lens 100 of the present example has a zoom ring 106, and the zoom operation is performed by manually operating the zoom ring 106.

<Internal Configuration of Imaging Apparatus>

[Zoom Lens]

Figure 3:
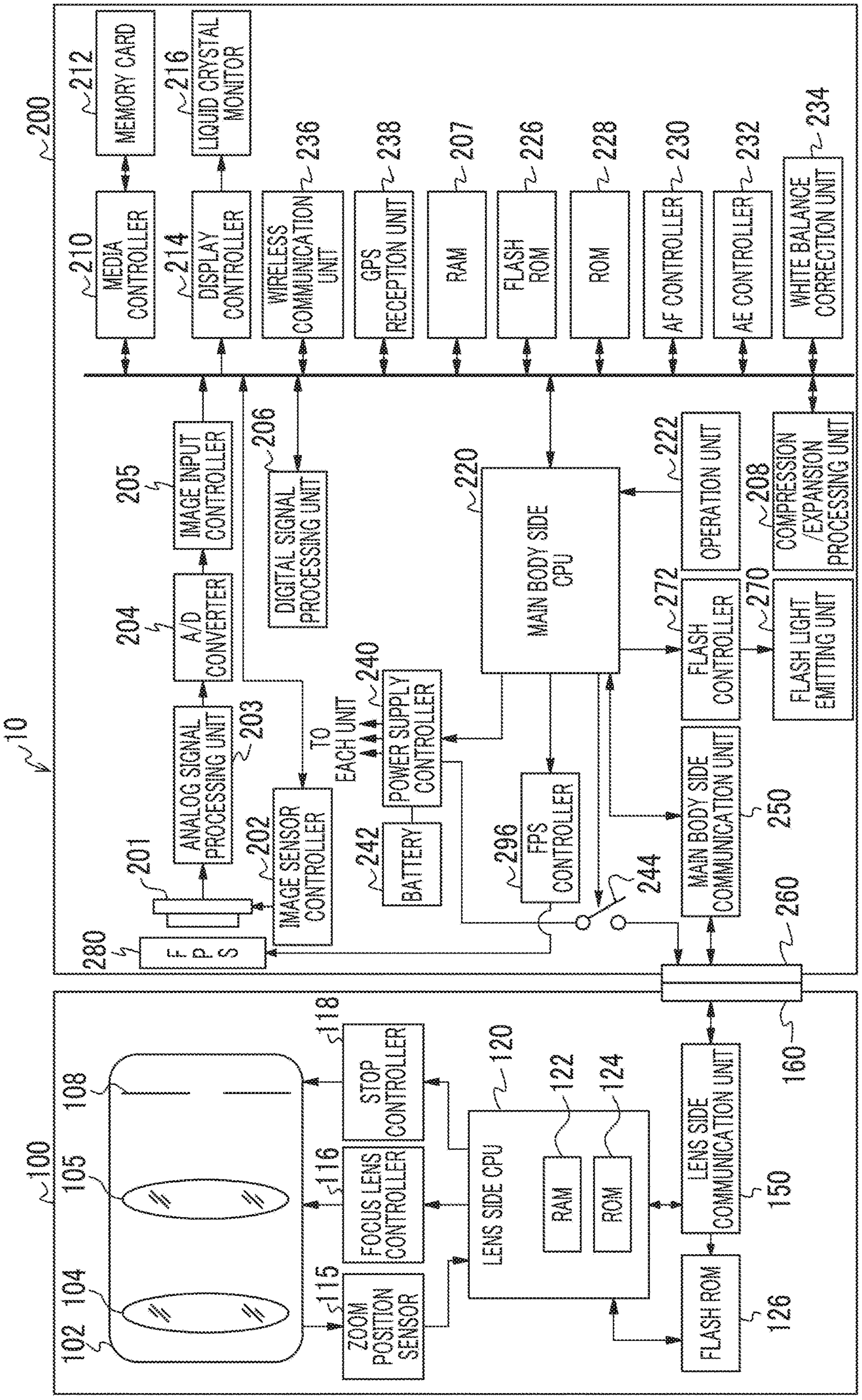
FIG. 3 is a block diagram showing an embodiment of an internal configuration of an imaging apparatus 10.

FIG. 3 is a block diagram showing an embodiment of the internal configuration of the imaging apparatus 10.

The zoom lens 100 shown in FIG. 3 comprises an imaging optical system 102, a zoom position sensor 115, a focus lens driving unit 116, a stop controller 118, a lens side central processing unit (CPU) 120, a flash read only memory (ROM) 126, a lens side communication unit 150, and a lens mount 160.

The imaging optical system 102 has a plurality of optical members including a zoom optical system 104, a focus optical system 105, and a stop 108. As described above, in a case where the zoom ring 106 shown in FIG. 1 is operated, the zoom optical system 104 performs the zoom operation, and the zoom position sensor 115 detects a position (zoom position) of the zoom optical system 104, and outputs zoom position information indicating the detected zoom position to the lens side CPU 120.

The focus lens driving unit 116 moves the focus optical system 105 to a focus position in the optical axis direction according to an instruction from the lens side CPU 120. The stop controller 118 controls the stop 108 according to the instruction from the lens side CPU 120.

The lens side CPU 120 integrally controls the zoom lens 100, and has a ROM 124 and a random access memory (RAM) 122 built therein.

The flash ROM 126 is a nonvolatile memory that stores programs downloaded from the camera main body 200.

The lens side CPU 120 integrally controls each unit of the zoom lens 100 according to a control program stored in the ROM 124 or the flash ROM 126, using the RAM 122 as a work region.

The lens side communication unit 150 communicates with the camera main body 200 via a plurality of signal terminals (lens side signal terminal) provided on the lens mount 160 while the lens mount 160 is mounted on the main body mount 260 of the camera main body 200. That is, the lens side communication unit 150 transmits and receives a request signal and an answer signal (two-way communication) to and from a main body side communication unit 250 of the camera main body 200 connected via the lens mount 160 and the main body mount 260 according to the instruction from the lens side CPU 120, and notifies the camera main body 200 of lens information (focus position information, zoom position information, stop information, and the like) of each optical member of the imaging optical system 102. The zoom lens 100 comprises a detection unit (not shown) that detects the focus position information of the focus optical system 105 and the stop information of the stop 108. Here, the stop information is information indicating a stop value (F-number) of the stop 108 and the like.

It is preferable that the lens side CPU 120 retains various pieces of lens information including the detected focus position information, the zoom position information, and the stop information in the RAM 122 in order to respond to a request of the lens information from the camera main body 200. In addition, the lens information is detected in a case where there is the request of the lens information from the camera main body 200, detected in a case where the optical member is driven, or detected at a fixed cycle (a cycle sufficiently shorter than a frame cycle of the motion picture), and a detection result can be retained.

The lens side communication unit 150 communicates with the camera main body 200 via a plurality of signal terminals (lens side signal terminal) provided on the lens mount 160 while the lens mount 160 is mounted on the main body mount 260 of the camera main body 200. That is, the lens side communication unit 150 transmits and receives the request signal and the answer signal (two-way communication) to and from the main body side communication unit 250 of the camera main body 200 connected via the lens mount 160 and the main body mount 260 according to the instruction from the lens side CPU 120, and notifies the camera main body 200 of the lens information (the focus position information of the focus lens, the focal length information, the stop information, and the like) of each optical member of the imaging optical system 102.

In addition, the zoom lens 100 also comprises a detection unit (not shown) that detects the focus position information of the focus lens and the stop information. Here, the stop information is information indicating a stop value (F-number) of the stop 108, an aperture diameter of the stop 108, and the like. Hereinafter, in this example, the F-number is used as the stop information.

It is preferable that the lens side CPU 120 retains various pieces of lens information including the detected focus position information, and the stop information in the RAM 122 in order to respond to the request of the lens information from the camera main body 200. In addition, the lens information is detected in a case where there is the request of the lens information from the camera main body 200, detected in a case where the optical member is driven, or detected at a fixed cycle (a cycle sufficiently shorter than a frame cycle of the motion picture), and a detection result can be retained.

[Camera Main Body]

The camera main body 200 constituting the imaging apparatus 10 shown in FIG. 3 comprises an image sensor 201, an image sensor controller 202, an analog signal processing unit 203, an analog/digital (A/D) converter 204, an image input controller 205, a digital signal processing unit 206, a RAM 207, a compression/expansion processing unit 208, a media controller 210, a memory card 212, a display controller 214, a liquid crystal monitor 216, a main body side CPU 220, an operation unit 222, a flash ROM 226, a ROM 228, an autofocus (AF) controller 230, an auto exposure (AE) controller 232, a white balance correction unit 234, a wireless communication unit 236, a global positioning system (GPS) reception unit 238, a power supply controller 240, a battery 242, a main body side communication unit 250, a main body mount 260, a flash light emitting unit 270, a flash controller 272, a focal-plane shutter (FPS) 280, and an FPS controller 296 constituting the built-in flash 30 (FIG. 1).

The image sensor 201, which is an imaging element is composed of a complementary metal-oxide semiconductor (CMOS) type color image sensor. The image sensor 201 is not limited to the CMOS type, and may be an XY address type or a charge coupled device (CCD) type image sensor.

In the image sensor 201, color filters of red (R), green (G), and blue (B) are arranged in a cyclical color array (for example, a typical Bayer array) on a plurality of pixels composed of photoelectric conversion elements (photodiode) two-dimensionally arranged in the x-direction (horizontal direction) and the y-direction (vertical direction), and microlenses are disposed on each photodiode.

The cyclical color array is not limited to the Bayer array and may be another color filter array such as an X-Trans (registered trademark) array. In addition, the image sensor 201 may be one in which a phase difference pixel (a pair of first and second phase difference pixel) and a normal pixel for imaging (a pixel other than the phase difference pixel) are disposed. In a case of the image sensor 201 in which the phase difference pixel is disposed, an image plane phase difference AF can be performed.

An optical image of a subject formed on a light receiving surface of the image sensor 201 by the imaging optical system 102 of the zoom lens 100 is converted into an electric signal by the image sensor 201. An electric charge corresponding to an amount of incident light is accumulated in each pixel of the image sensor 201, and an electric signal corresponding to the amount of electric charges accumulated in each pixel is read as an image signal from the image sensor 201.

The image sensor controller 202 performs readout control of the image signal from the image sensor 201 according to the instruction from the main body side CPU 220. In addition, the image sensor controller 202 has an electronic shutter function of causing an electronic shutter control signal from the main body side CPU 220 to simultaneously discharge the electric charges accumulated in each pixel of the image sensor 201 (reset all at once) to start exposure.

The analog signal processing unit 203 performs various kinds of analog signal processing on an analog image signal obtained by capturing an image of a subject with the image sensor 201. The analog signal processing unit 203 is configured to include a sampling and holding circuit, a color separation circuit, an automatic gain control (AGC) circuit, and the like. The AGC circuit functions as a sensitivity adjustment unit that adjusts the sensitivity (ISO: international organization for standardization) at the time of imaging, adjusts a gain of an amplifier that amplifies an input image signal, and makes a signal level of the image signal fall within an appropriate range. The A/D converter 204 converts the analog image signal output from the analog signal processing unit 203 into a digital image signal.

Image data (mosaic image data) of each RGB pixel output via the image sensor 201, the analog signal processing unit 203, and the A/D converter 204 at the time of capturing a still image or a motion picture is input from the image input controller 205 to the RAM 207 and is temporarily stored. In a case where the image sensor 201 is a CMOS type image sensor, the analog signal processing unit 203 and the A/D converter 204 are often built in the image sensor 201.

The digital signal processing unit 206 performs various types of digital signal processing on the image data stored in the RAM 207. The digital signal processing unit 206 appropriately reads the image data stored in the RAM 207, performs digital signal processing such as offset processing, gain control processing including sensitivity correction, gamma correction processing, demosaic processing (also called demosaicing processing and synchronization processing), RGB/YCrCb conversion processing or the like on the read image data, and stores the image data after the digital signal processing in the RAM 207 again. The demosaic processing is processing of calculating color information of all RGB for each pixel from a mosaic image consisting of RGB, for example, in a case of an image sensor consisting of three RGB color filters, mosaic data (dot-sequential RGB data), and generating image data of three RGB planes synchronized from the mosaic data (point-sequential RGB data).

The RGB/YCrCb conversion processing is processing of converting the synchronized RGB data into luminance data (Y) and color difference data (Cr, Cb).

In addition, in a case where the exposure of the inter-exposure zoom imaging is ended before the exposure time in the inter-exposure zoom imaging reaches the target exposure time and the image captured by the inter-exposure zoom imaging is underexposed, the digital signal processing unit 206 functioning as the image processing unit can perform processing of applying the gain which is determined by the ratio of the target exposure time and the actual exposure time or the difference between the target exposure time and the actual exposure time to the image captured by the inter-exposure zoom imaging. As a result, it is possible to prevent underexposure of the image captured by the inter-exposure zoom imaging.

The compression/expansion processing unit 208 compresses the uncompressed luminance data Y and the color difference data Cb and Cr once stored in the RAM 207 in a case of recording a still image or a motion picture. For example, the still image is compressed by a joint photographic coding experts group (JPEG) format, and the motion picture is compressed by H.264 format. The image data compressed by the compression/expansion processing unit 208 is recorded in the memory card 212 via the media controller 210. In addition, the compression/expansion processing unit 208 performs expansion processing on the compressed image data obtained from the memory card 212 via the media controller 210 in the play mode to generate uncompressed image data.

The media controller 210 performs control for recording the image data compressed by the compression/expansion processing unit 208 in the memory card 212. In addition, the media controller 210 performs readout control of the compressed image data from the memory card 212.

The display controller 214 controls the liquid crystal monitor 216 consisting of a liquid crystal display device.

In a case where the live view image is displayed on the liquid crystal monitor 216, the digital image signal continuously generated by the digital signal processing unit 206 is temporarily stored in the RAM 207. The display controller 214 converts the digital image signal temporarily stored in the RAM 207 into a signal format for display and sequentially outputs it to the liquid crystal monitor 216. Accordingly, the captured image is displayed on the liquid crystal monitor 216 in real time, and composition can be determined by the live view image displayed on the liquid crystal monitor 216.

In a case where the exposure time priority mode is set, and the exposure time priority mode is set and the exposure time in the inter-exposure zoom imaging reaches the target exposure time before the angle of view of a zoom lens 100 reaches the "end angle of view" and the exposure of the inter-exposure zoom imaging ends, the display controller 214 can display information indicating that the exposure of the inter-exposure zoom imaging ends before reaching the "end angle of view" on a liquid crystal monitor 216.

The user can check by the display of the liquid crystal monitor 216 that the inter-exposure zoom imaging ends before reaching the "end angle of view", and can know that the inter-exposure zoom imaging as intended by the user cannot be performed. As a result, the user can redo the inter-exposure zoom imaging.

The shutter release switch 22 is an imaging instruction unit that inputs the imaging instruction, and is configured with a two-step stroke type switch consisting of so-called "half-press" and "full-press".

In a still image imaging mode and the imaging mode of the inter-exposure zoom imaging, in a case where the shutter release switch 22 is half-pressed, an S1 ON signal is output, and in a case where the shutter release switch 22 is full-pressed by pressing further than the half-press, an S2 ON signal is output. In the case where the S1 ON signal is output, the main body side CPU 220 executes imaging preparation processing such as autofocus (AF) control and auto exposure (AE) control, and in the case where the S2 ON signal is output, the main body side CPU 220 executes the still image, imaging processing of the inter-exposure zoom imaging, and recording processing. It is needless to say that the AF control and the AE control are automatically performed in a case where an automatic mode is set by the operation unit 222, respectively, and the AF control and the AE control are not performed in a case where a manual mode is set.

In addition, in a video imaging mode, in a case where the shutter release switch 22 is full-pressed to output the S2 ON signal, the camera main body 200 enters a motion picture recording mode for starting recording of a motion picture, executes image processing and recording processing of the motion picture, and then, in a case where the shutter release switch 22 is full-pressed again to output the S2 ON signal, the camera main body 200 enters a standby state and temporarily stops recording processing of the motion picture.

The shutter release switch 22 is not limited to the form of the two-step stroke type switch consisting of the half-press and the full-press, and may output the S1 ON signal and the S2 ON signal by one operation, or may be provided with individual switches to output the S1 ON signal and the S2 ON.

In addition, in a form in which the operation instruction is performed by a touch panel or the like, the operation instruction may be output by touching a region corresponding to the operation instruction displayed on a screen of the touch panel as these operation means, and the form of the operation means is not limited to these as long as it instructs imaging preparation processing or imaging processing.

The still image or the motion picture acquired by imaging is compressed by the compression/expansion processing unit 208, and the compressed image data is stored in the memory card 212 via the media controller 210 after necessary additional information such as imaging date and time, GPS information, and imaging conditions (F-number, shutter speed, ISO sensitivity, and the like) are made into an image file added to a header.

The main body side CPU 220 integrally controls the operation of the entire camera main body 200 and the driving or the like of the optical member of the zoom lens 100, and controls each unit of the camera main body 200 and the zoom lens 100 on the basis of an input from the operation unit 222 or the like including the shutter release switch 22.

The flash ROM 226 is a readable and writable nonvolatile memory and stores setting information. The ROM 228 stores a camera control program (including the program of the imaging apparatus) executed by the main body side CPU 220, defect information on the image sensor 201, and various parameters and tables used for image processing and the like. The main body side CPU 220 controls each unit of the camera main body 200 and the zoom lens 100 while using the RAM 207 as a work region according to the camera control program stored in the ROM 228.

In the case where the image sensor 201 is the image sensor in which phase difference pixel is disposed, an AF controller 230 calculates a defocus amount by multiplying a phase shift amount of each output of a pair of phase difference pixels on the image sensor 201 by a coefficient corresponding to a current F-number (ray angle) of the zoom lens 100, and outputs the calculated defocus amount to the main body side CPU 220.

The main body side CPU 220 transmits the defocus amount input from the AF controller 230 to the lens side CPU 120 by communication. The focus lens driving unit 116 of the zoom lens 100 moves the focus optical system 105 to the focus position in the optical axis direction according to the instruction (defocus amount) from the lens side CPU 120, and thereby focus is automatically adjusted.

In a case where the image sensor 201 is not the image sensor in which the phase difference pixel is disposed, the AF controller 230 extracts a high-frequency component from a G signal of a G pixel (a pixel with a G color filter) in an AF region of the image sensor 201, calculates an integral value (focus evaluation value) of an absolute value of the extracted high-frequency component, and outputs a position (that is, a position where a contrast becomes maximum) in which the calculated focus evaluation value becomes maximum to the main body side CPU 220 as focus position information.

The main body side CPU 220 transmits the defocus amount input from the AF controller 230 to the lens side CPU 120 by communication. The focus lens driving unit 116 of the zoom lens 100 moves the focus optical system 105 to the focus position in the optical axis direction according to the instruction (focus position information) from the lens side CPU 120, and thereby focus is automatically adjusted.

The AE controller 232 is a unit that detects brightness of a subject (subject luminance), and calculates a numerical value (exposure value (EV value)) required for AE control that corresponds to the subject luminance. The AE controller 232 calculates the EV value on the basis of the luminance of the image acquired via the image sensor 201, the shutter speed at the time of acquiring the luminance of the image, and the F-number.

The AE controller 232 can determine the F-number, the shutter speed, and the ISO sensitivity from a predetermined program diagram on the basis of the calculated EV value, and perform the AE control.

The white balance correction unit 234 calculates white balance (WB) gains Gr, Gg, and Gb for each color data of RGB data (R data, G data, and B data) inputted from the image input controller 205, and performs white balance correction by multiplying the R data, the G data, and the B data by the calculated WB gains Gr, Gg, and Gb, respectively. Here, as a method of calculating the WB gains Gr, Gg, and Gb, methods of specifying a light source type illuminating the subject on the basis of the brightness of the subject (EV value) and a color temperature of ambient light acquired by an AE controller 1230, and reading WB gains corresponding to the specified light source type from a storage unit in which an appropriate WB gain is previously stored for each light source type is conceivable, but another known method of obtaining the WB gains Gr, Gg, and Gb by using at least the EV value is also conceivable.

The wireless communication unit 236 is a unit that performs short range wireless communication of standards such as wireless fidelity (Wi-Fi) (registered trademark) and Bluetooth (registered trademark), and transmits and receives necessary information to and from peripheral digital devices (mobile terminals such as smartphones).

The GPS reception unit 238 receives GPS signals transmitted from a plurality of GPS satellites according to the instruction of the main body side CPU 220, executes positioning computation processing based on the received plurality of GPS signals, and acquires GPS information consisting of latitude, longitude, and altitude of the camera main body 200. The acquired GPS information can be recorded in the header of the image file as additional information indicating the image capturing position of the captured image.

The power supply controller 240 applies a power supply voltage supplied from the battery 242 to each unit of the camera main body 200 according to the instruction from the main body side CPU 220. In addition, the power supply controller 240 applies the power supply voltage supplied from the battery 242 to each unit of the zoom lens 100 via the main body mount 260 and the lens mount 160 according to the instruction from the main body side CPU 220.

A lens power switch 244 performs on/off switching and level switching of power supply voltage applied to the zoom lens 100 via the main body mount 260 and the lens mount 360 according to the instruction from the main body side CPU 220.

The main body side communication unit 250 transmits and receives (two-way communication) a request signal and an answer signal to and from the lens side communication unit 150 of the zoom lens 100 connected via the main body mount 260 and the lens mount 160 according to the instruction from the main body side CPU 220. As shown in FIG. 1, the main body mount 260 is provided with a plurality of terminals 260A, and in a case where the zoom lens 100 is mounted (the lens mount 160 and the main body mount 260 are connected) on the camera main body 200, the plurality of terminals 260A (FIG. 1) provided on the main body mount 260 and the plurality of terminals (not shown) provided on the lens mount 160 are electrically connected, so that the two-way communication can be performed between the main body side communication unit 250 and the lens side communication unit 150.

The built-in flash 30 (FIG. 1) is, for example, a through the lens (TTL) automatic light control type flash, and is configured with the flash light emitting unit 270 and the flash controller 272.

The flash controller 272 has a function of adjusting a light emission amount (guide number) of flash light emitted from the flash light emitting unit 270. That is, the flash controller 272 causes the flash light emitting unit 270 to emit light in synchronization with a flash imaging instruction from the main body side CPU 220, starts photometry of the reflected light (including ambient light) incident via the imaging optical system 102 of the zoom lens 100, and stops the flash light emitted from the flash light emitting unit 270 in a case where the photometric value reaches a standard exposure value.

A focal-plane shutter (FPS) 254 constitutes a mechanical shutter of the imaging apparatus 10 and is disposed immediately before the image sensor 201. An FPS controller 256 controls opening and closing of a front curtain and a back curtain of the FPS 254 on the basis of input information (S2 ON signal, shutter speed, and the like) from the main body side CPU 220, and controls the exposure time (shutter speed) in the image sensor 201.

[First Embodiment of Imaging Apparatus]

The MENU/OK key 27, the cross key 28, and the liquid crystal monitor 216 functioning as the end angle of view setting unit can set the "end angle of view" of the inter-exposure zoom imaging in the on-screen interactive method by using the menu screen displayed on the liquid crystal monitor 216.

For example, after setting the imaging mode of the inter-exposure zoom imaging, the zoom ring 106 is manually operated, the "end angle of view" is checked on the liquid crystal monitor 216, and then the "end angle of view" can be set by operating the MENU/OK key 27.

This "end angle of view" acquires zoom position information indicating the zoom position of the zoom optical system 104 from the zoom position sensor 115 of the zoom lens 100, and can set the acquired zoom position information as the "end angle of view".

The main body side CPU 220 or the AE controller 232 functioning as an exposure controller starts exposure by the image sensor 201 of the inter-exposure zoom imaging in a case of receiving the imaging instruction from the shutter release switch 22 after the imaging mode of the inter-exposure zoom imaging is set and the "end angle of view" is set by the end angle of view setting unit, and ends exposure by the image sensor 201 of the inter-exposure zoom imaging in a case where the angle of view of the zoom lens 100 zoomed by at least the manual operation reaches the "end angle of view".

The user may perform the zooming operation of the zoom lens 100 beyond the exposure time in the inter-exposure zoom imaging without being conscious of the "end angle of view" of the inter-exposure zoom imaging. In the case where the angle of view of the zoom lens 100 reaches the "end angle of view", the inter-exposure zoom imaging ends regardless of the zoom operation of the zoom lens 100 by the user, so that the "start angle of view" and the "end angle of view" of the image captured by the inter-exposure zoom imaging can be set to the angle of view as intended by the user.

Here, the "start angle of view" of the inter-exposure zoom imaging can be checked by the live view image displayed on the liquid crystal monitor 216 before the inter-exposure zoom imaging. On the other hand, in the case where the inter-exposure zoom imaging starts, the live view image cannot be displayed on the liquid crystal monitor 216 since the image cannot be read from the image sensor 201, but in a case where the angle of view of the zoom lens 100 reaches a preset "end angle of view", the user can zoom the zoom lens 100 manually without being conscious of the "end angle of view" since the inter-exposure zoom imaging ends automatically.

[Second Embodiment of Imaging Apparatus]

The MENU/OK key 27, the cross key 28, and the liquid crystal monitor 216 functioning as the target exposure time setting unit are a unit for setting the exposure time (target exposure time) of the inter-exposure zoom imaging in the on-screen interactive method by using the menu screen displayed on the liquid crystal monitor 216, and can set the exposure time for a long-time exposure of, for example, one second to several seconds.

In addition, the MENU/OK key 27, the cross key 28, and the liquid crystal monitor 216 functioning as the exposure time priority mode setting unit can set the "exposure time priority mode" in which the "target exposure time" of the inter-exposure zoom imaging is prioritized over the "end angle of view" in the on-screen interactive method by using the menu screen displayed on the liquid crystal monitor 216.

That is, in a case where the speed of the angle of view variation of the zoom lens 100 by the zoom operation of the user is slower than the ideal angle of view variation of the zoom lens 100 with respect to the "target exposure time", the angle of view of the zoom lens 100 reaches the "target exposure time" before reaching the "end angle of view".

The main body side CPU 220 or the AE controller 232 functioning as an exposure controller starts exposure by the image sensor 201 of the inter-exposure zoom imaging in a case of receiving the imaging instruction from the shutter release switch 22 after the imaging mode of the inter-exposure zoom imaging is set and the "end angle of view" is set by the end angle of view setting unit, and ends exposure by the image sensor 201 of the inter-exposure zoom imaging in a case where the angle of view of the zoom lens 100 zoomed by at least the manual operation reaches the "end angle of view". However, in the case where the "exposure time priority mode" is set and the "target exposure time" is reached before reaching the "end angle of view", the inter-exposure zoom imaging ends.

The AE controller 232 functioning as the automatic exposure controller sets the exposure control parameter (F-number, ISO sensitivity, and the like) other than the target exposure time in the case where the inter-exposure zoom imaging is performed on the basis of the target exposure time set by the target exposure time setting unit and the brightness of the subject (EV value) obtained at the "start angle of view" and the "end angle of view" of the inter-exposure zoom imaging, and controls exposure during the inter-exposure zoom imaging with the set exposure control parameter.

In this way, by controlling the exposure during the inter-exposure zoom imaging, the image captured by the inter-exposure zoom imaging can be properly exposed.

[First and Second Modification Examples according to Second Embodiment of Imaging Apparatus]

The state in which the angle of view of the zoom lens 100 reaches the "target exposure time" before reaching the "end angle of view" and the inter-exposure zoom imaging ends occurs in a case where the speed of the angle of view variation of the zoom lens 100 by the zoom operation of the user is slower than the ideal angle of view variation. In this case, it is impossible to perform the inter-exposure zoom imaging as intended by the user.

Therefore, in the first modification example, in the case where the "target exposure time" is reached before reaching the "end angle of view" and the inter-exposure zoom imaging ends, the media controller 210 functioning as the recording unit records the information indicating that the inter-exposure zoom imaging ends before reaching the "end angle of view" in association with the image captured by the inter-exposure zoom imaging in a case where the image captured by the inter-exposure zoom imaging is recorded on the memory card 212.

In addition, in the second modification example, in the case where the exposure time in the inter-exposure zoom imaging reaches the "target exposure time" before the angle of view of the zoom lens 100 reaches the "end angle of view" and the exposure of the inter-exposure zoom imaging ends, the display controller 214 displays the information indicating that the exposure of the inter-exposure zoom imaging ends before reaching the "end angle of view" on the liquid crystal monitor 216.

The user can know from the information displayed on the liquid crystal monitor 216 that the inter-exposure zoom imaging is not performed as intended, and can redo the inter-exposure zoom imaging as necessary.

[Third and Fourth Modification Examples according to Second Embodiment of Imaging Apparatus]

In a case where the speed of the angle of view variation of the zoom lens 100 by the zoom operation of the user is faster than the ideal angle of view variation, the angle of view of the zoom lens 100 reaches the "end angle of view" before reaching the "target exposure time", and the inter-exposure zoom imaging ends.

In this case, the image captured by the inter-exposure zoom imaging is underexposed.

In the third modification example according to the second embodiment of the imaging apparatus, in a case where the angle of view of the zoom lens 100 reaches the "end angle of view" before the exposure time in the inter-exposure zoom imaging reaches the "target exposure time", and the exposure of the inter-exposure zoom imaging ends, the media controller 210 records the "target exposure time" and the "actual exposure time", the ratio of the "target exposure time" and the "actual exposure time", or the difference between the "target exposure time" and the "actual exposure time" on the memory card 212 in association with the image captured by the inter-exposure zoom imaging.

By recording the information in association with the image captured by the inter-exposure zoom imaging, the image (image captured in a state of underexposure) captured by the inter-exposure zoom imaging can be used as information for correcting to proper exposure.

In the fourth modification example according to the second embodiment of the imaging apparatus, in the case where the angle of view of the zoom lens 100 reaches the "end angle of view" before the exposure time in the inter-exposure zoom imaging reaches the "target exposure time", and the exposure of the inter-exposure zoom imaging ends, the digital signal processing unit 206 functioning as the image processing unit performs processing of applying the gain determined by the ratio of the "target exposure time" and the "actual exposure time", or the difference between the "target exposure time" and the "actual exposure time" to the image (image captured in a state of underexposure) captured by the inter-exposure zoom imaging. As a result, the gain can be corrected such that the image captured by the inter-exposure zoom imaging is not underexposed.

[Third Embodiment of Imaging Apparatus]

In the third embodiment of the imaging apparatus, a function of assisting the zoom operation of the user is added.

Figure 4:
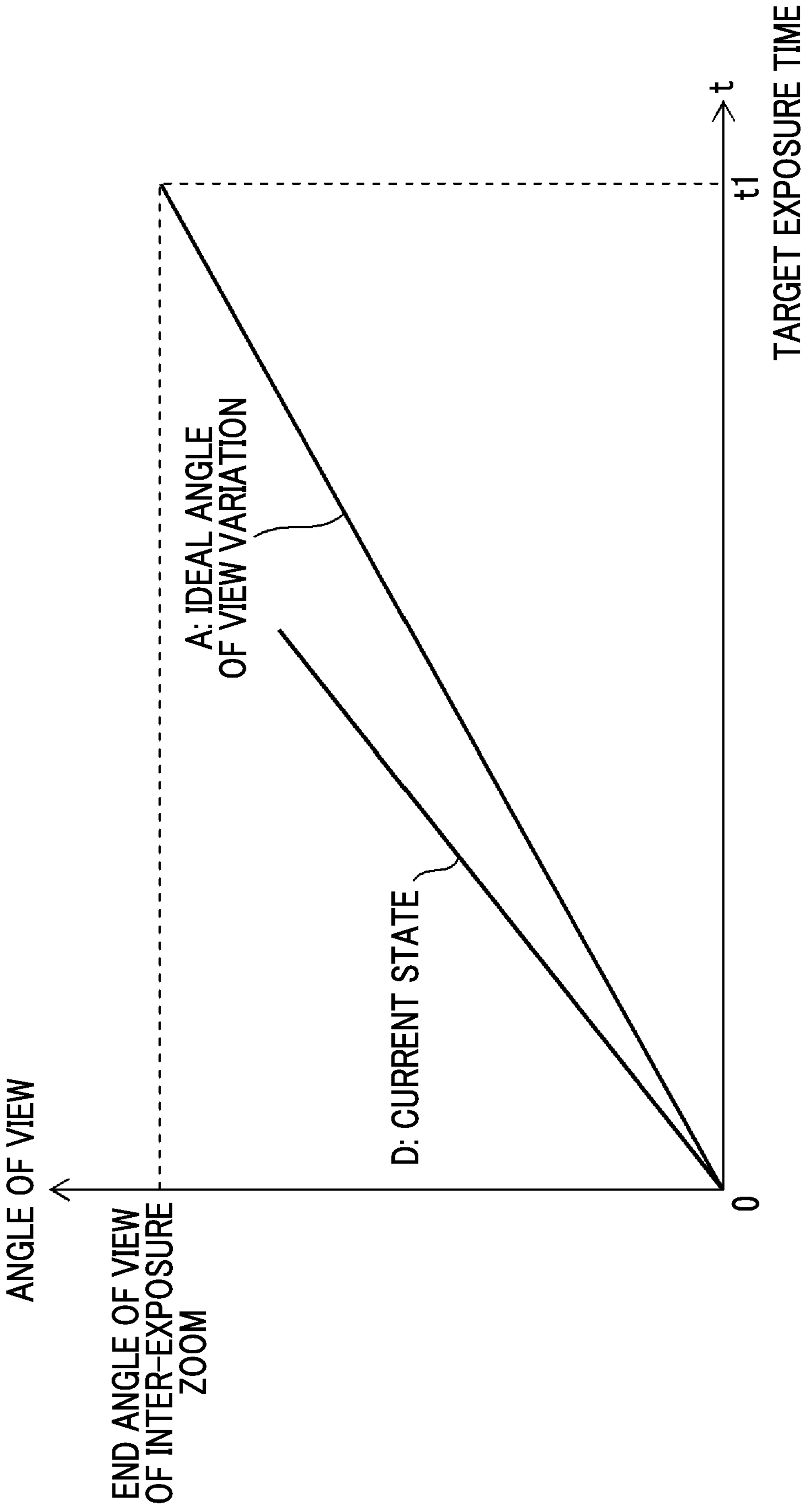
FIG. 4 is a graph showing a state of an ideal angle of view variation A and a current angle of view variation D.

FIG. 4 is a graph showing an ideal angle of view variation A on the two-dimensional coordinate having the first axis (lateral axis) indicating an elapsed time from the exposure start of the inter-exposure zoom imaging and the second axis (vertical axis) indicating the change amount of the angle of view from a start angle of view of the inter-exposure zoom imaging, and a state of the ideal angle of view variation A and a current angle of view variation D.

The ideal angle of view variation A in this example is an angle of view variation in which the angle of view linearly changes from the start angle of view and reaches the "end angle of view" in a case where the target exposure time (t1) has elapsed.

It can be seen that a graph showing the current angle of view variation D shown in FIG. 4 has an inclination larger than that of the graph showing the ideal angle of view variation A, and a rotation speed of the zoom lens 100 is faster than a rotation speed of the zoom ring 106 of the zoom lens 100 giving the ideal angle of view variation A.

In the case where the speed of the angle of view variation of the zoom lens 100 is faster than the ideal angle of view variation A, the "end angle of view" is reached before reaching the "target exposure time", and the image captured by the inter-exposure zoom imaging is underexposed. On the other hand, in a case where the speed of the angle of view variation of the zoom lens 100 is slower than the ideal angle of view variation A, the "target exposure time" is reached before reaching the "end angle of view", the inter-exposure zoom imaging ends, and thus the inter-exposure zoom imaging as intended by the user cannot be performed.

Therefore, in the third embodiment of the imaging apparatus, the display controller 214 displays information indicating a relationship between the "current exposure time" with respect to the "target exposure time" and the "current angle of view" with respect to the "end angle of view" of the inter-exposure zoom imaging during the inter-exposure zoom imaging on a liquid crystal monitor 216.

The user can adjust the speed of the angle of view variation of the zoom lens 100 while observing the information displayed on the liquid crystal monitor 216, and thereby can set the angle of view of the zoom lens 100 to the "end angle of view" in the case where the exposure time reaches the "target exposure time".

Specifically, the display controller 214 displays, on the screen of the liquid crystal monitor 216, the "target exposure time" and the "end angle of view" on the two-dimensional coordinate shown in FIG. 4, and displays, on at least two-dimensional coordinate, a graph showing the exposure time and the current angle of view (for example, the current angle of view variation D), which show the current state. By comparing the current exposure time and the current angle of view with respect to the "target exposure time" and the "end angle of view", the user can determine whether or not the current exposure time and the current angle of view (current angle of view variation D) deviate from the ideal angle of view variation A, and thereby can adjust the speed of the angle of view variation of the zoom lens 100.

In addition, it is preferable that the display controller 214 further displays a graph showing the ideal angle of view variation A which becomes the end angle of view in a case where the target exposure time elapses, on the two-dimensional coordinate displayed on the screen of the liquid crystal monitor 216.

The user can perform the zooming operation of the zoom lens 100 such that the current angle of view and angle of view variation (current angle of view variation D) follow the graph while observing the graph showing the ideal angle of view variation A displayed on the screen of the liquid crystal monitor 216.

Further, it is preferable that the user can appropriately adjust the graph showing the ideal angle of view variation.

Figure 5:
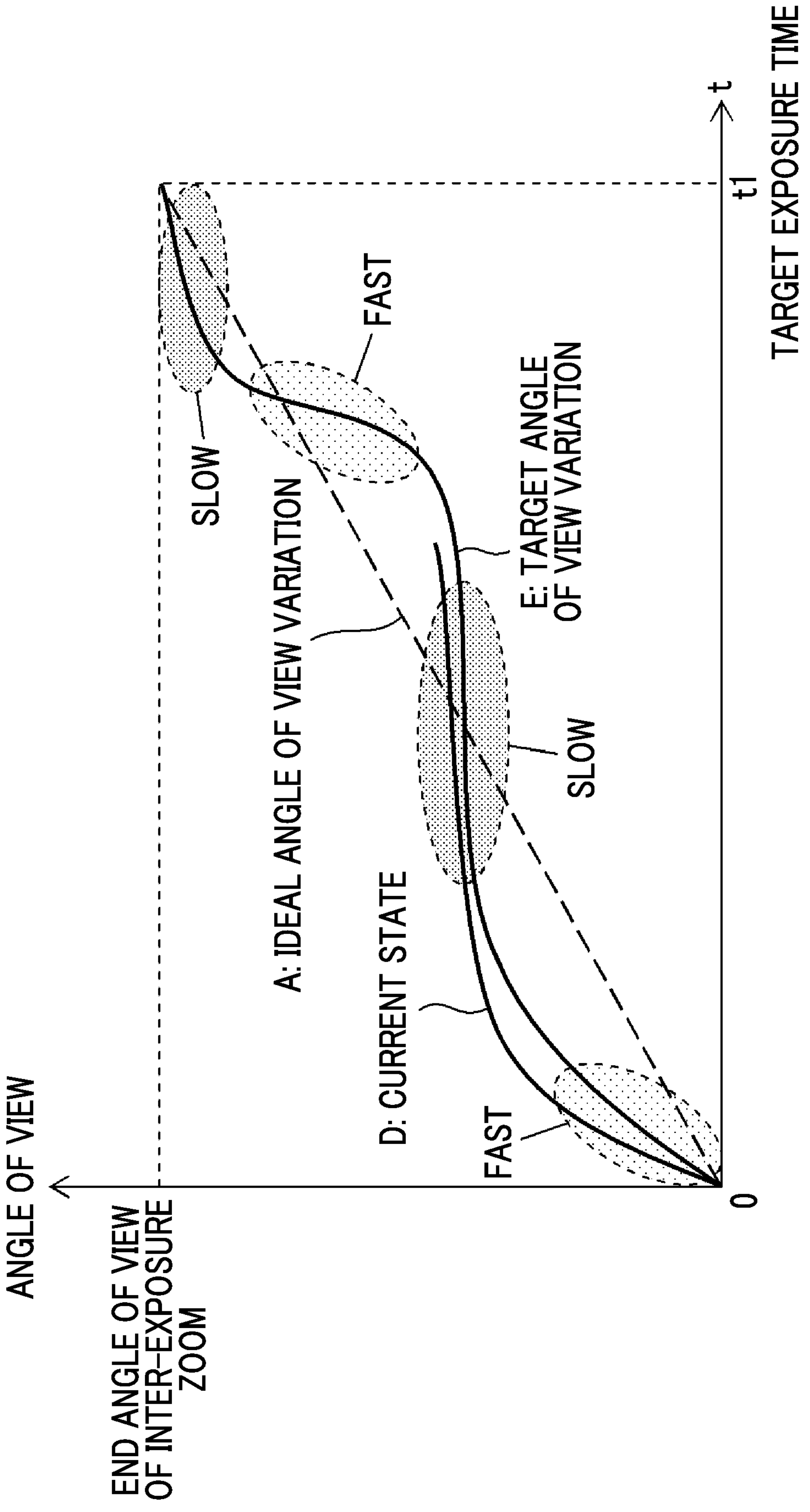
FIG. 5 is a graph showing an ideal angle of view variation A indicated by a broken line and a target angle of view variation E specified by a user.

FIG. 5 is a graph showing a "target angle of view variation E" specified by the user, which is different from the ideal angle of view variation A indicated by a broken line.

The graph showing the "target angle of view variation E" can be generated, for example, by deforming a linear graph indicating the ideal angle of view variation A according to a user instruction.

That is, the shape of the graph showing the "target angle of view variation E" displayed on the liquid crystal monitor 216 is randomly changed by using an instruction unit (for example, in a case where the cross key 28 and the liquid crystal monitor 216 have a touch panel, a pointing device such as a touch panel) that manually inputs an instruction to deform the shape of the graph.

"Target angle of view variation E" shown in FIG. 5 is set such that the angle of view variation of an intermediate angle of view between the "start angle of view" and the "end angle of view" and the angle of view in the vicinity of the "end angle of view" is slower than the ideal angle of view variation A, and the angle of view variation of the other angle of view is slower than the ideal angle of view variation A.

The user can perform the zooming operation of the zoom lens 100 such that the current angle of view and angle of view variation follow the graph while observing the graph showing the "target angle of view variation E" in which the angle of view variation speed is appropriately set.

[Fourth Embodiment of Imaging Apparatus]

In the fourth embodiment of the imaging apparatus, the main body side CPU 220 functioning as the exposure controller does not start exposure of the inter-exposure zoom imaging by a release operation of the shutter release switch 22, but receives the imaging instruction related to the zoom operation of the zoom lens 100 and starts the exposure of the inter-exposure zoom imaging.

Specifically, the fourth embodiment of the imaging apparatus further comprises a zoom operation detection unit that detects the zoom operation of the zoom lens 100. The main body side CPU 220 functioning as the zoom operation detection unit acquires zoom position information from the zoom position sensor 115, and can detect the zoom operation from a change of the acquired zoom position information.

The main body side CPU 220 functioning as the exposure controller receives the imaging instruction for the inter-exposure zoom imaging by being triggered with detection of the zoom operation, and starts the exposure of the inter-exposure zoom imaging. For example, in the release operation of the shutter release switch 22, in a case where the zoom operation of the zoom lens 100 is detected after the release operation without starting the inter-exposure zoom imaging, the exposure of the inter-exposure zoom imaging is started.

Thus, the user can start the inter-exposure zoom imaging by performing the zooming operation of the zoom lens 100, and does not need to perform the shutter release operation simultaneously with the zoom operation of the zoom lens 100. In addition, the user can eliminate the complication of simultaneously performing the shutter release operation and the zoom operation.

[Fifth Embodiment of Imaging Apparatus]

In the fifth embodiment of the imaging apparatus, the imaging apparatus comprises the start angle of view setting unit that sets the start angle of view of the inter-exposure zoom imaging.

The MENU/OK key 27, the cross key 28, and the liquid crystal monitor 216 function as the start angle of view setting unit that sets the "start angle of view" of the inter-exposure zoom imaging using, for example, the on-screen interactive method.

The start angle of view setting unit can set the "start angle of view" similarly to the case of setting the "end angle of view" by the end angle of view setting unit. For example, after setting the imaging mode of the inter-exposure zoom imaging, the zoom ring 106 is manually operated, the "start angle of view" is checked on the liquid crystal monitor 216, and then the "start angle of view" can be set by operating the MENU/OK key 27. This "start angle of view" acquires zoom position information indicating the zoom position of the zoom optical system 104 from the zoom position sensor 115 of the zoom lens 100, and can set the acquired zoom position information as the "start angle of view".

The AE controller 232 or the main body side CPU 220 functioning as the exposure controller sets the imaging mode of the inter-exposure zoom imaging, sets the "start angle of view" by the start angle of view setting unit, and sets the "end angle of view" by the end angle of view setting unit. Furthermore, the AE controller 232 or the main body side CPU 220 starts the exposure of the inter-exposure zoom imaging by being triggered with the angle of view of the zoom lens 100 that has reached the "start angle of view" after receiving the imaging instruction from the shutter release switch 22.

In this case, the zoom position of the zoom lens 100 at the time of receiving the imaging instruction from the shutter release switch 22 needs to be positioned at an angle of view opposite to the "end angle of view" with the "start angle of view" in between. The user performs the zooming operation of the zoom lens 100 such that the angle of view of the zoom lens 100 passes through the "start angle of view" and the "end angle of view".

The exposure controller starts the inter-exposure zoom imaging by being triggered with the current angle of view of the zoom lens 100 that has reached the "start angle of view", and then ends the inter-exposure zoom imaging in a case of reaching the "end angle of view".

As a result, the zooming operation of the zoom lens 100 can be performed at the desired angle of view variation speed from the time point of starting the inter-exposure zoom imaging.

[First Embodiment of Inter-Exposure Zoom Imaging Method]

Figure 6:
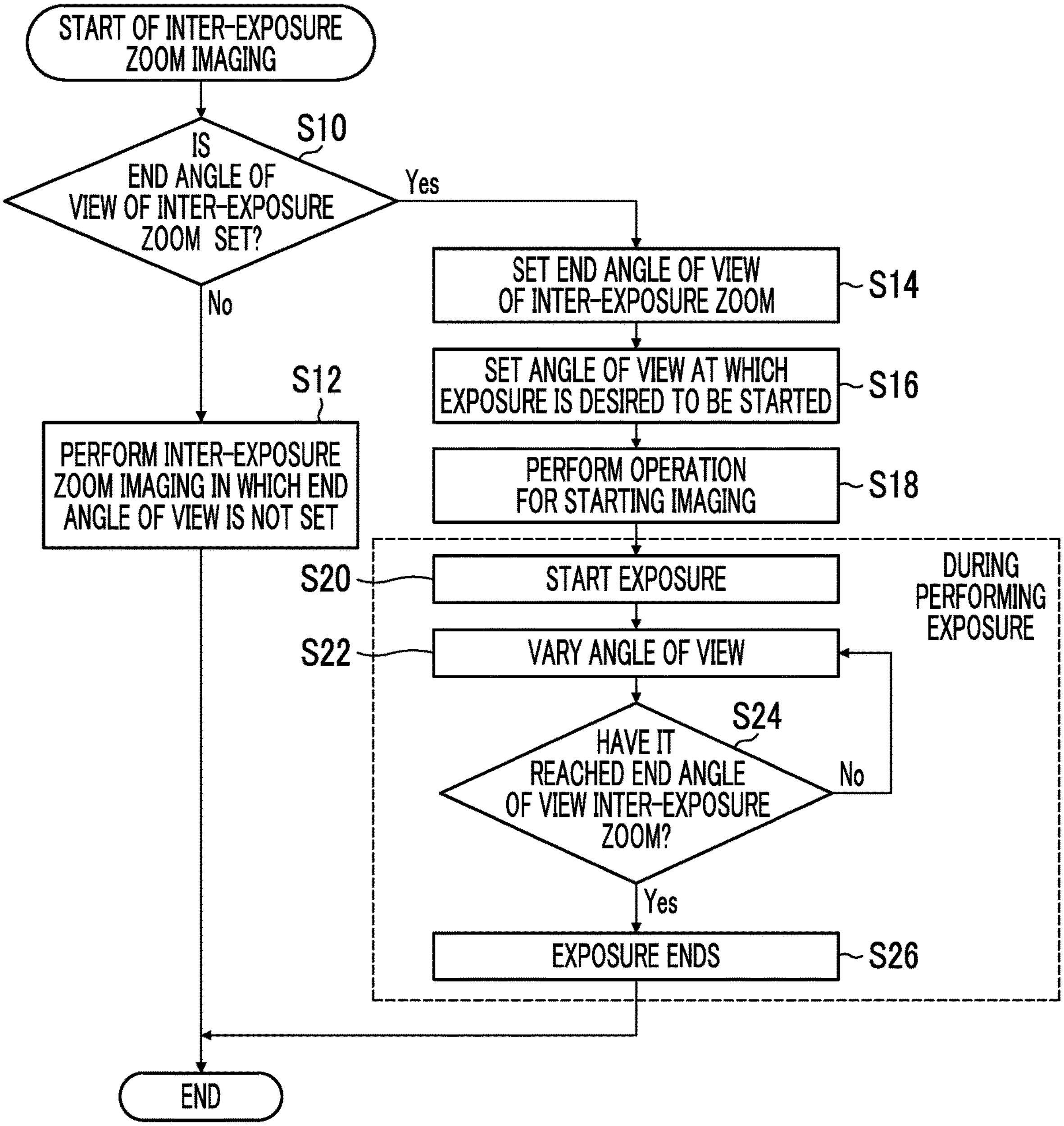
FIG. 6 is a flowchart showing a first embodiment of an inter-exposure zoom imaging method according to the present invention.

FIG. 6 is a flowchart showing a first embodiment of the inter-exposure zoom imaging method according to the present invention.

Each unit including the main body side CPU 220 of the camera main body 200 shown in FIG. 3 executes the processing shown in FIG. 6 according to the camera control program stored in the ROM 228.

In the case of performing the inter-exposure zoom imaging, it is preferable to fix the camera main body 200 to a tripod (not shown). Generally, the "start angle of view" of the inter-exposure zoom imaging is a wide angle and the "end angle of view" is telephoto, but the "start angle of view" may be telephoto and the "end angle of view" may be the wide angle. In this example, the "start angle of view" of the inter-exposure zoom imaging is the wide angle, and the "end angle of view" is telephoto.

In the case of performing the inter-exposure zoom imaging, the user sets the imaging mode for performing the inter-exposure zoom imaging by the imaging mode setting unit, manually operates the zoom ring 106 of the zoom lens 100 during the inter-exposure zoom imaging, and performs zoom driving from the "start angle of view" for imaging a wide angle image to the "end angle of view" for imaging a telephoto image.

In FIG. 6, in the case of performing the inter-exposure zoom imaging, first, it is determined whether or not to set the "end angle of view" of the inter-exposure zoom imaging to perform imaging (step S10). This determination can be made by the user using the menu screen displayed on the liquid crystal monitor 216.

In a case of performing the inter-exposure zoom imaging without setting the "end angle of view" (in a case of "No"), the conventional inter-exposure zoom imaging in which the "end angle of view" is not set is performed (step S12).

On the other hand, in a case where performing the inter-exposure zoom imaging by setting the "end angle of view" (in a case of "Yes"), the "end angle of view" is set by the end angle of view setting unit (step S14). In this case, the user operates the zoom ring 106 of the zoom lens 100 and operates the MENU/OK key 27 in a case where a desired telephoto image is displayed while observing the live view image to be displayed on the liquid crystal monitor 216 to set the "end angle of view" which is an angle of view corresponding to the telephoto image.

Subsequently, the user operates the zoom ring 106 of the zoom lens 100 to set an angle of view (start angle of view) at which the inter-exposure zoom imaging is desired to be started (step S16). In this example, the start angle of view can be set by returning the zoom lens 100 to the zoom position where a desired wide angle image is displayed while observing the live view image displayed on the liquid crystal monitor 216.

Next, the user performs an operation for starting the inter-exposure zoom imaging (step S18). In this example, it is possible to start the inter-exposure zoom imaging by operating the shutter release switch 22. The operation for starting the inter-exposure zoom imaging may be by being triggered with detection of the first zoom operation after the shutter release switch 22 is operated.

In the case where the operation for starting the inter-exposure zoom imaging is performed, the main body side CPU 220 executes exposure processing of the inter-exposure zoom imaging surrounded by a dotted line.

First, the electric charges accumulated in each pixel of the image sensor 201 are simultaneously discharged (reset all at once) to start exposure (accumulation of electric charges is started) (step S20). At the same time, the user manually operates the zoom ring 106 of the zoom lens 100 to perform the zoom operation (step S22). That is, the angle of view of the zoom lens 100 is varied from the "start angle of view" to the "end angle of view".

Then, it is determined whether or not the current angle of view of the zoom lens 100 has reached the "end angle of view" during the inter-exposure zoom imaging (step S24). In a case where the current angle of view has not reached the "end angle of view" (in a case of "No"), the process returns to step S22, and the inter-exposure zoom imaging is continuously performed. In a case where the current angle of view reaches the "end angle of view" (in a case of "Yes"), the process proceeds to step S26, and the inter-exposure zoom imaging is ended. The main body side CPU 220 ends the inter-exposure zoom imaging by performing shutter control for closing the focal-plane shutter 280 that is opened during the inter-exposure zoom imaging via the FPS controller 296.

The user can know that the inter-exposure zoom imaging ends by a shutter sound in the case where the focal-plane shutter 280 is closed, and thus the zoom operation by the manual operation of the zoom lens 100 can be ended.

Thus, the user can perform the zooming operation of the zoom lens 100 without being conscious of the "end angle of view" of the inter-exposure zoom imaging and can perform the inter-exposure zoom imaging as intended by the user in which the angle of view varies from the "start angle of view" at the time of starting the inter-exposure zoom imaging to a preset "end angle of view".

[Second Embodiment of Inter-Exposure Zoom Imaging Method]

Figure 7:
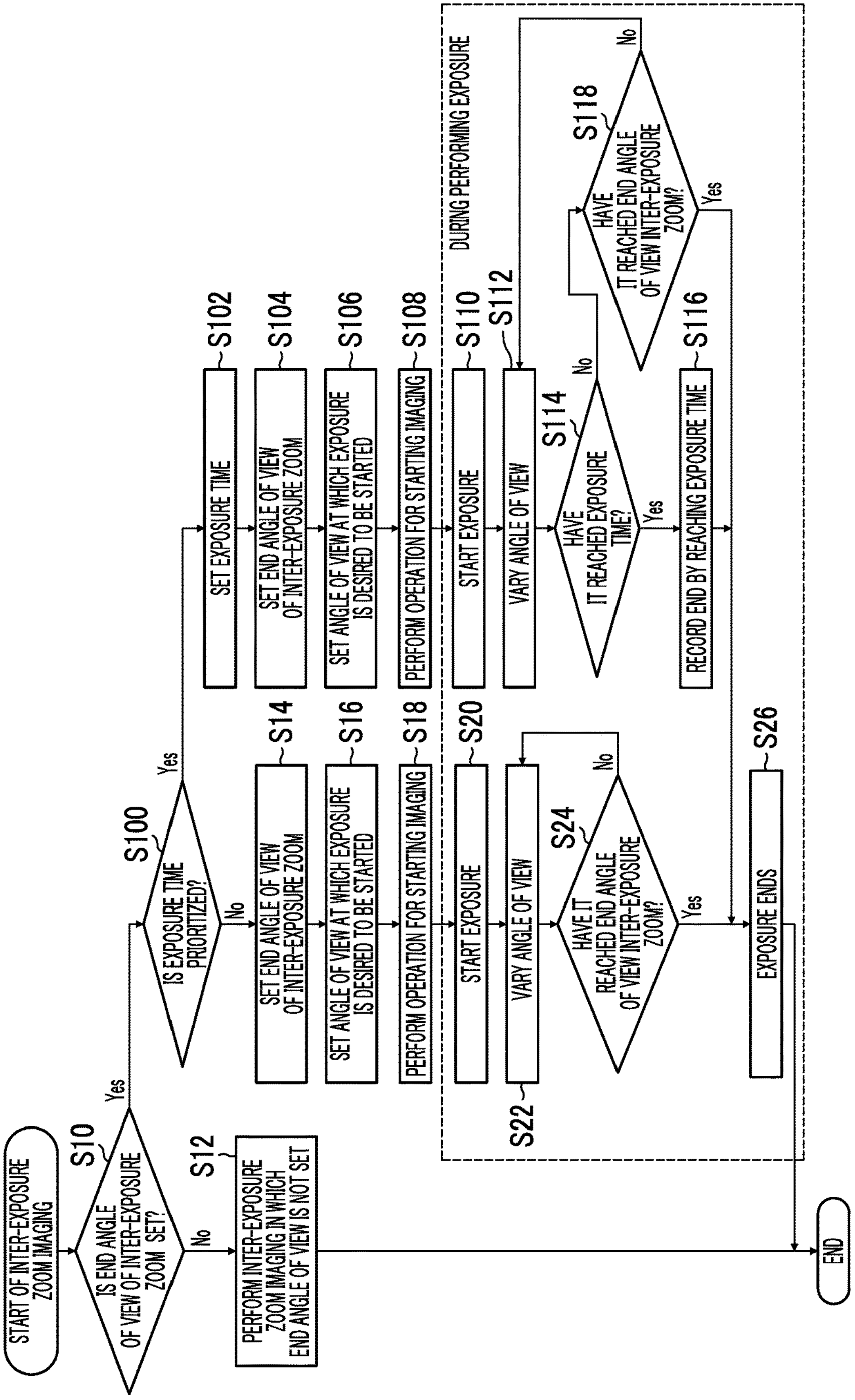
FIG. 7 is a flowchart showing a second embodiment of the inter-exposure zoom imaging method according to the present invention.

FIG. 7 is a flowchart showing a second embodiment of the inter-exposure zoom imaging method according to the present invention. In FIG. 7, the same step numbers are assigned to the steps common to the flowchart of the first embodiment of the inter-exposure zoom imaging method shown in FIG. 6, and detailed description thereof is omitted.

Figure 8:
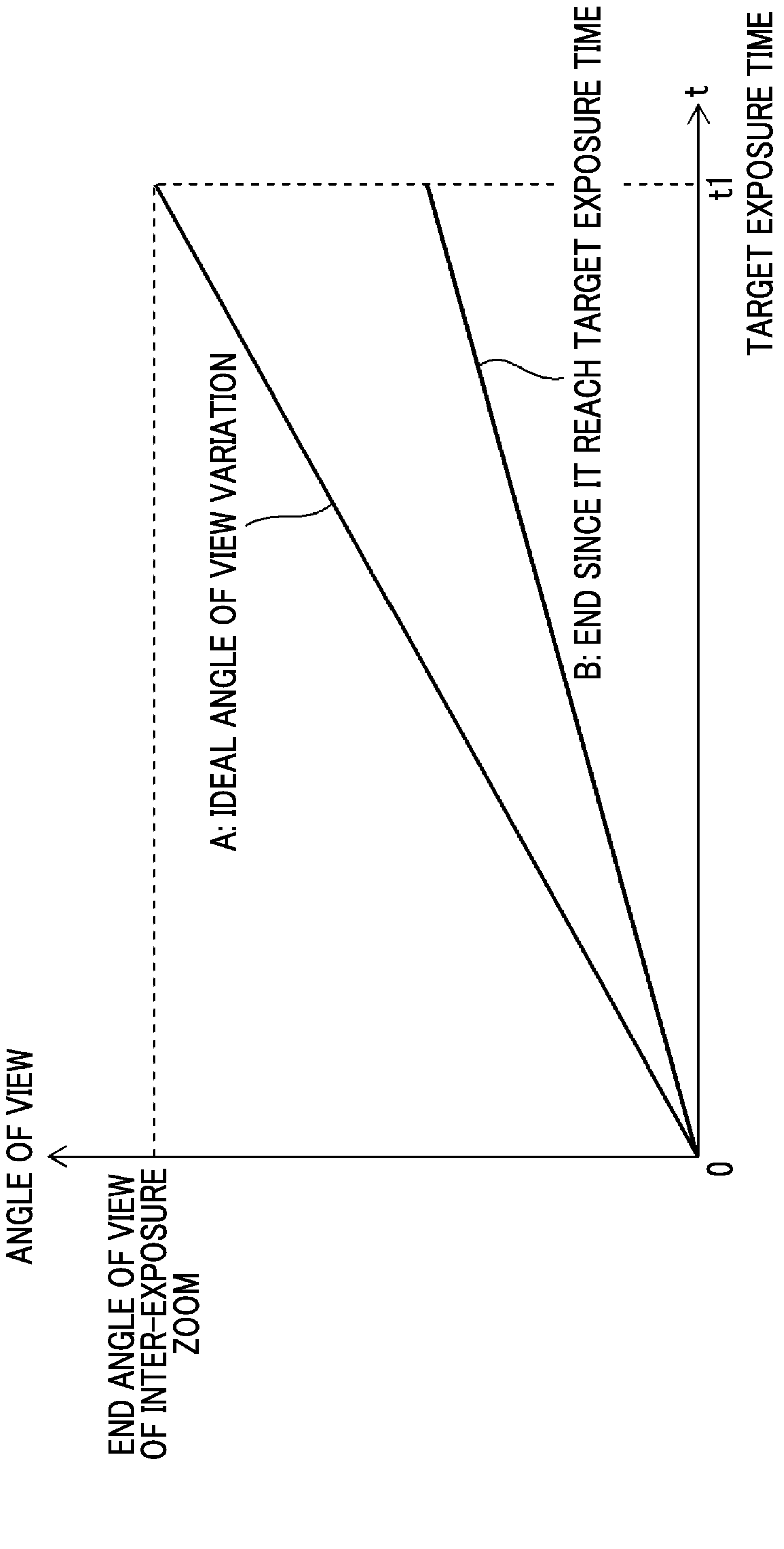
FIG. 8 is a graph showing the ideal angle of view variation A and an angle of view variation B having a smaller angle of view variation than the ideal angle of view variation A.

FIG. 8 is a graph showing the ideal angle of view variation A on the two-dimensional coordinate having a lateral axis indicating an elapsed time from the exposure start of the inter-exposure zoom imaging and a vertical axis indicating the change amount of the angle of view from the start angle of view of the inter-exposure zoom imaging, and an angle of view variation B having a smaller angle of view variation than the ideal angle of view variation A.

The second embodiment of the inter-exposure zoom imaging method shown in FIG. 7 differs from the first embodiment in that it mainly includes a step of setting the exposure time priority mode, and the inter-exposure zoom imaging by the exposure time priority mode is added.

Here, the exposure time priority mode is a mode in which the exposure time in the inter-exposure zoom imaging is prioritized over the end angle of view, and is a mode in which the inter-exposure zoom imaging is ended even before reaching the "end angle of view" in a case where the target exposure time (t1) is reached after starting the inter-exposure zoom imaging, as shown in the angle of view variation B shown in FIG. 8.

As shown in FIG. 8, in a case where the rotation speed of the zoom lens 100 is slower than the rotation speed of the zoom ring 106 of the zoom lens 100 giving the ideal angle of view variation A, the angle of view variation B is smaller than the ideal angle of view variation A.

In FIG. 7, in a case where the "end angle of view" of the inter-exposure zoom imaging is set and imaging is performed, the main body side CPU 220 further determines whether or not the exposure time is prioritized over the "end angle of view" (whether or not to perform the inter-exposure zoom imaging by the exposure time priority mode) (step S100). This determination can be made on the basis of whether or not the exposure time priority mode setting unit has set the exposure time priority mode.

In a case where the inter-exposure zoom imaging by the exposure time priority mode is not performed (in a case of "No"), the process proceeds to step S14, and the same inter-exposure zoom imaging as in the first embodiment is performed.

In a case where the inter-exposure zoom imaging by the exposure time priority mode is performed (in a case of "Yes"), the process proceeds to step S102.

In step S102, the user sets the exposure time (target exposure time) of the inter-exposure zoom imaging by the target exposure time setting unit. After the "target exposure time" is set, the inter-exposure zoom imaging is started through processing of steps S104, S106, and S108. The processing of steps S104, S106, and S108 is the same as processing of steps S14, S16, and S18 of the first embodiment.

Simultaneously with the start (step S110) of the inter-exposure zoom imaging, the user manually operates the zoom ring 106 of the zoom lens 100 to vary the angle of view of the zoom lens 100 from the "start angle of view" to the "end angle of view" (step S112).

Subsequently, the main body side CPU 220 determines whether or not the exposure time after starting the inter-exposure zoom imaging has reached the "target exposure time" set in step S102 (step S114).

In a case where it is determined that the exposure time in the inter-exposure zoom imaging has reached the "target exposure time", the main body side CPU 220 ends the inter-exposure zoom imaging through the processing of step S116 (step S26).

In step S116 of the present example, information indicating that the inter-exposure zoom imaging has been ended by reaching the "target exposure time" before reaching the "end angle of view" is recorded in the memory card 212 in association with the image captured by the inter-exposure zoom imaging, but the information indicating that the inter-exposure zoom imaging has been ended by reaching the "target exposure time" before reaching the "end angle of view" may be displayed on the liquid crystal monitor 216.

On the other hand, in a case where it is determined in step S114 that the exposure time in the inter-exposure zoom imaging has not reached the "target exposure time", it is determined whether or not the current angle of view of the zoom lens 100 has reached the "end angle of view" (step S118). In a case where the current angle of view has not reached the "end angle of view" (in a case of "No"), the process returns to step S112, and the inter-exposure zoom imaging is continuously performed. In a case where the current angle of view reaches the "end angle of view" (in a case of "Yes"), the process proceeds to step S26, and the inter-exposure zoom imaging is ended.

In this way, even in the case where the rotation speed of the zoom lens 100 is slower than the rotation speed of the zoom ring 106 of the zoom lens 100 giving the ideal angle of view variation A as shown in FIG. 8, the exposure time in the inter-exposure zoom imaging is not longer than the target exposure time, and overexposure of the image captured by the inter-exposure zoom imaging can be prevented.

[Third Embodiment of Inter-Exposure Zoom Imaging Method]

Figure 9:
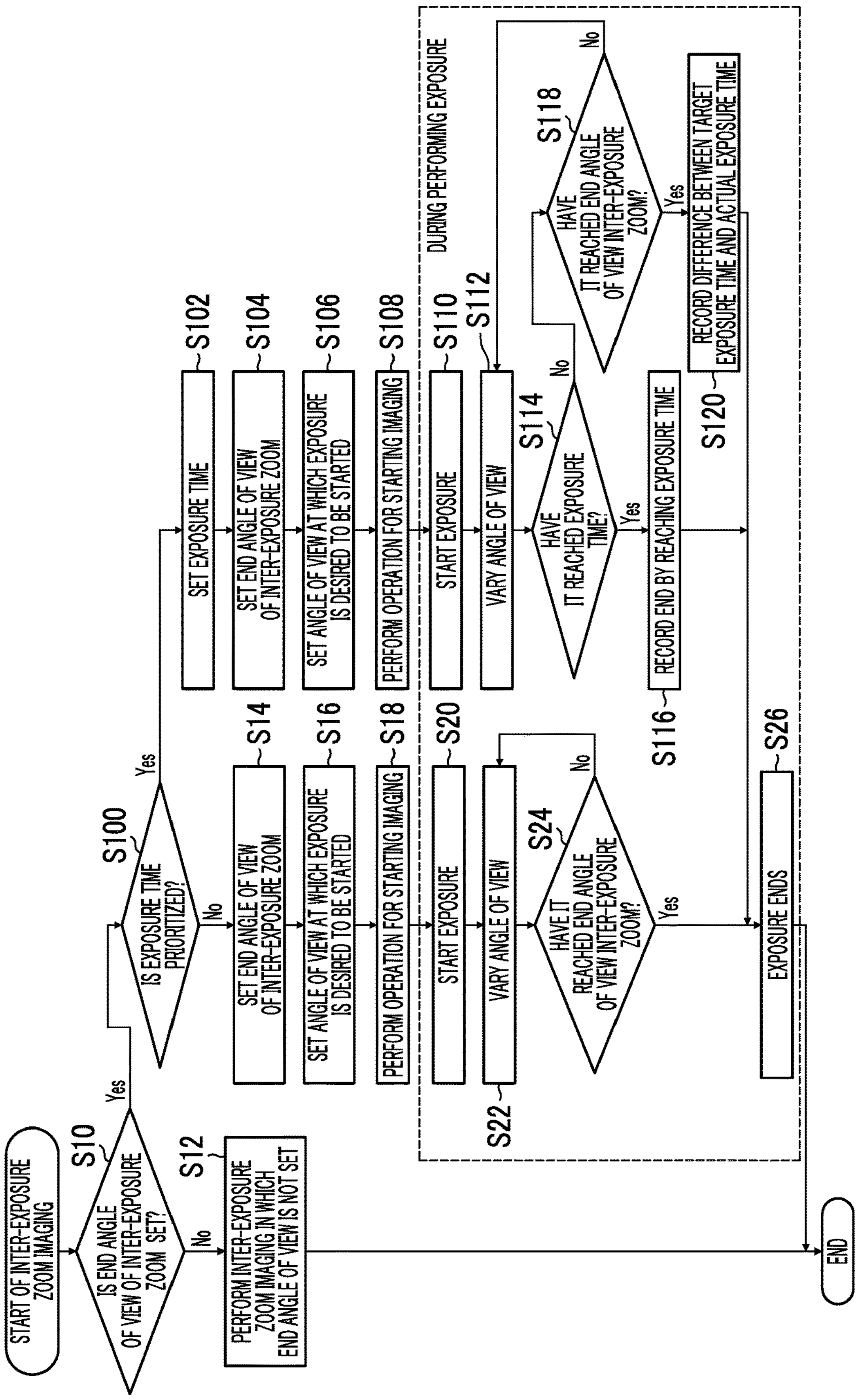
FIG. 9 is a flowchart showing a third embodiment of the inter-exposure zoom imaging method according to the present invention.

FIG. 9 is a flowchart showing a third embodiment of the inter-exposure zoom imaging method according to the embodiment of the present invention. In FIG. 9, the same step numbers are assigned to the steps common to the flowchart of the second embodiment of the inter-exposure zoom imaging method shown in FIG. 7, and detailed description thereof is omitted.

Figure 10:
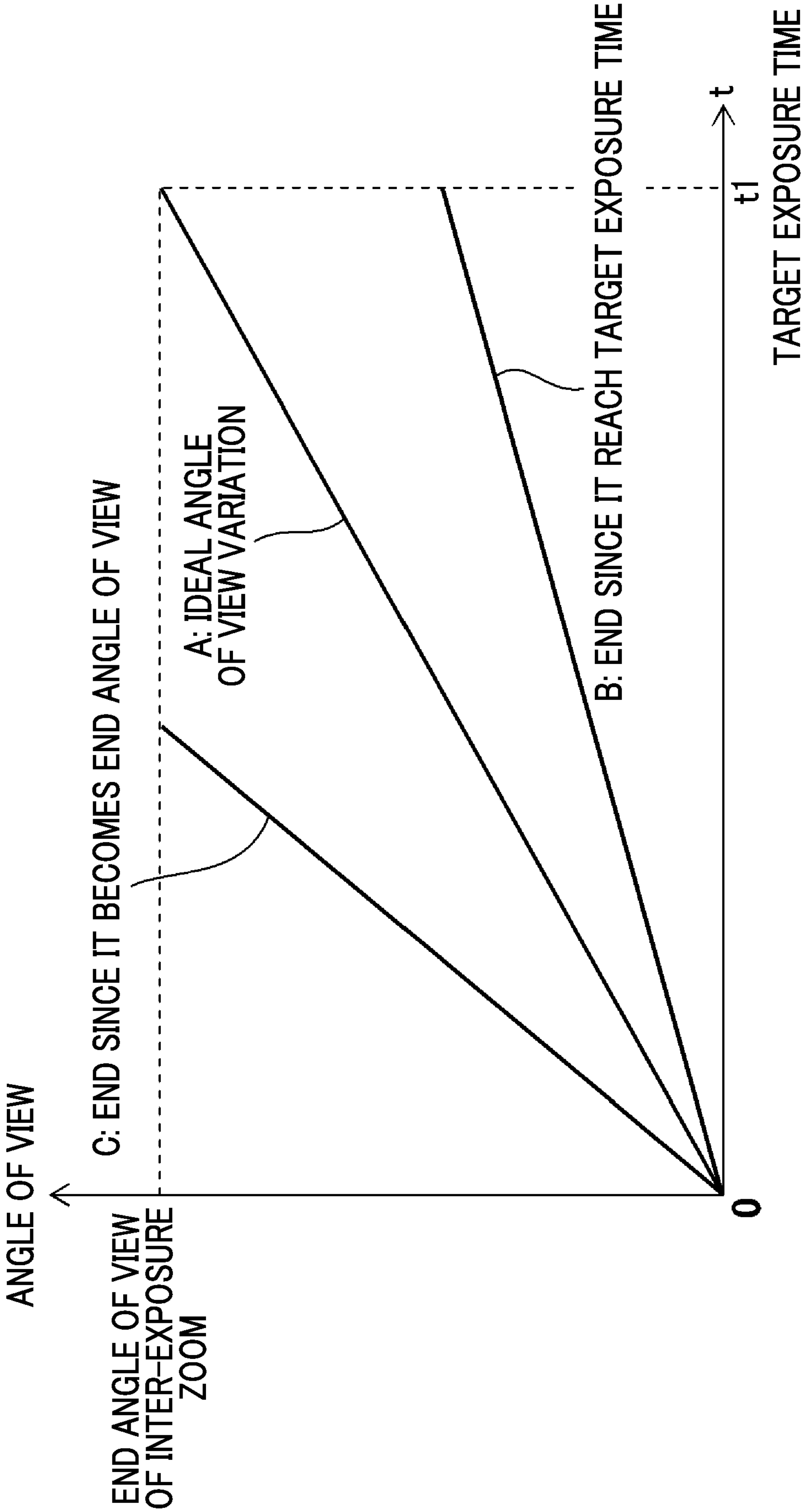
FIG. 10 is a graph showing the ideal angle of view variation A, the angle of view variation B having the smaller angle of view variation than the ideal angle of view variation A, and an angle of view variation C having a larger angle of view variation than the ideal angle of view variation A.

FIG. 10 is a graph showing the ideal angle of view variation A on the two-dimensional coordinate having the lateral axis indicating the elapsed time from the exposure start of the inter-exposure zoom imaging and the vertical axis indicating the change amount of the angle of view from the start angle of view of the inter-exposure zoom imaging, the angle of view variation B having the smaller angle of view variation than the ideal angle of view variation A, and an angle of view variation C having a larger angle of view variation than the ideal angle of view variation A.

The third embodiment of the inter-exposure zoom imaging method shown in FIG. 9 is different from the second embodiment mainly in that processing of step S120 is added.

In the case where the rotation speed of the zoom lens 100 is faster than the rotation speed of the zoom ring 106 of the zoom lens 100 giving the ideal angle of view variation A (the case of the angle of view variation C in FIG. 10), the angle of view of the zoom lens 100 becomes the "end angle of view" before reaching the "target exposure time".

In step S118, it is determined whether or not the current angle of view of the zoom lens 100 has reached the "end angle of view", and in a case where the current angle of view has reached the "end angle of view" (in a case of "Yes"), the process proceeds to step S26 through step S120, and the inter-exposure zoom imaging is ended.

In step S120 of the present example, in a case where the current angle of view reaches the "end angle of view" and the inter-exposure zoom imaging ends, the media controller 210 functioning as the recording unit records the difference between the "target exposure time" and the "actual exposure time" in the memory card 212 in association with the image captured by the inter-exposure zoom imaging. In addition to the difference between the "target exposure time" and the "actual exposure time", the "target exposure time" and the "actual exposure time" may be recorded in the memory card 212, or the ratio of the "target exposure time" and the "actual exposure time" may be recorded in the memory card 212.

In the case where the current angle of view reaches the "end angle of view" and the inter-exposure zoom imaging ends, the image captured by the inter-exposure zoom imaging is underexposed since the "target exposure time" has not reached.

Information such as the difference between the "target exposure time" and the "actual exposure time" recorded in association with the image captured by the inter-exposure zoom imaging can be used as information for correcting the brightness of the image captured by the inter-exposure zoom imaging with underexposure.

In addition, it is not limited to the case where the information such as the difference between the "target exposure time" and the "actual exposure time" is recorded in the memory card 212, and the gain may be determined by the ratio of the "target exposure time" and the "actual exposure time" or the difference between the "target exposure time" and the "actual exposure time", and the determined gain may be applied to the image (underexposed image) captured by the inter-exposure zoom imaging.

[Fourth Embodiment of Inter-Exposure Zoom Imaging Method]

Figure 11:
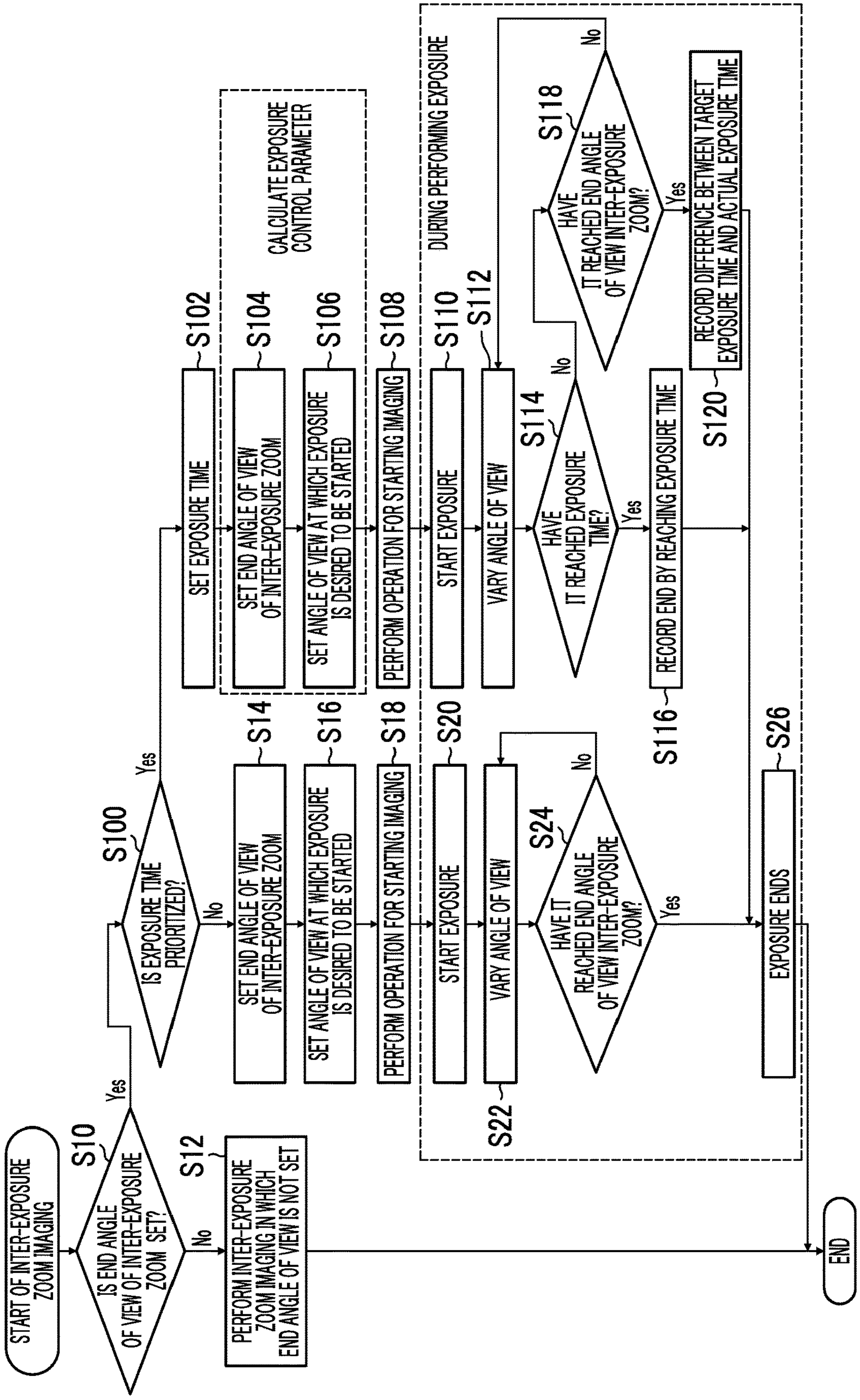
FIG. 11 is a flowchart showing a fourth embodiment of the inter-exposure zoom imaging method according to the present invention.

FIG. 11 is a flowchart showing a fourth embodiment of the inter-exposure zoom imaging method according to the embodiment of the present invention. In FIG. 11, the same step numbers are assigned to the steps common to the flowchart of the third embodiment of the inter-exposure zoom imaging method shown in FIG. 9, and detailed description thereof is omitted.

The fourth embodiment of the inter-exposure zoom imaging method shown in FIG. 11 is different from the third embodiment in that the AE controller 232 functioning as the automatic exposure controller calculates the exposure control parameter and performs automatic exposure control in the inter-exposure zoom imaging after processing of steps S104 and S106.

Since the exposure time (target exposure time) is set in step S102, the AE controller 232 uses this "target exposure time" as the shutter speed during automatic exposure control.

In addition, brightness (EV value) of the subject corresponding to an image (telephoto image) obtained in the "end angle of view" of the inter-exposure zoom imaging set in step S104 and brightness (EV value) of the subject corresponding to an image (wide angle image) obtained in the "start angle of view" of the inter-exposure zoom imaging adjusted in step S106 are used to determine brightness (EV value) (for example, an average value of the brightness of the subject corresponding to the telephoto image (EV value) and the brightness of the subject corresponding to the wide angle image (EV value)) of the subject at the time of the inter-exposure zoom imaging.

The AE controller 232 calculates exposure control parameters (F-number, ISO sensitivity, and the like) other than the "target exposure time" on the basis of the brightness (EV value) of the subject at the time of the inter-exposure zoom imaging and a preset "target exposure time".

Then, the AE controller 232 performs automatic exposure control on the basis of the calculated exposure control parameters during performing exposure of the inter-exposure zoom imaging.

In step S118, in the case where it is determined that the current angle of view has reached the "end angle of view" and the inter-exposure zoom imaging ends, the image captured by the inter-exposure zoom imaging is underexposed since the "target exposure time" has not reached, but at least the overexposure of the image captured by the inter-exposure zoom imaging can be prevented. The underexposed image can be corrected to an image corresponding to proper exposure by gain correction.

[Fifth Embodiment of Inter-Exposure Zoom Imaging Method]

Figure 12:
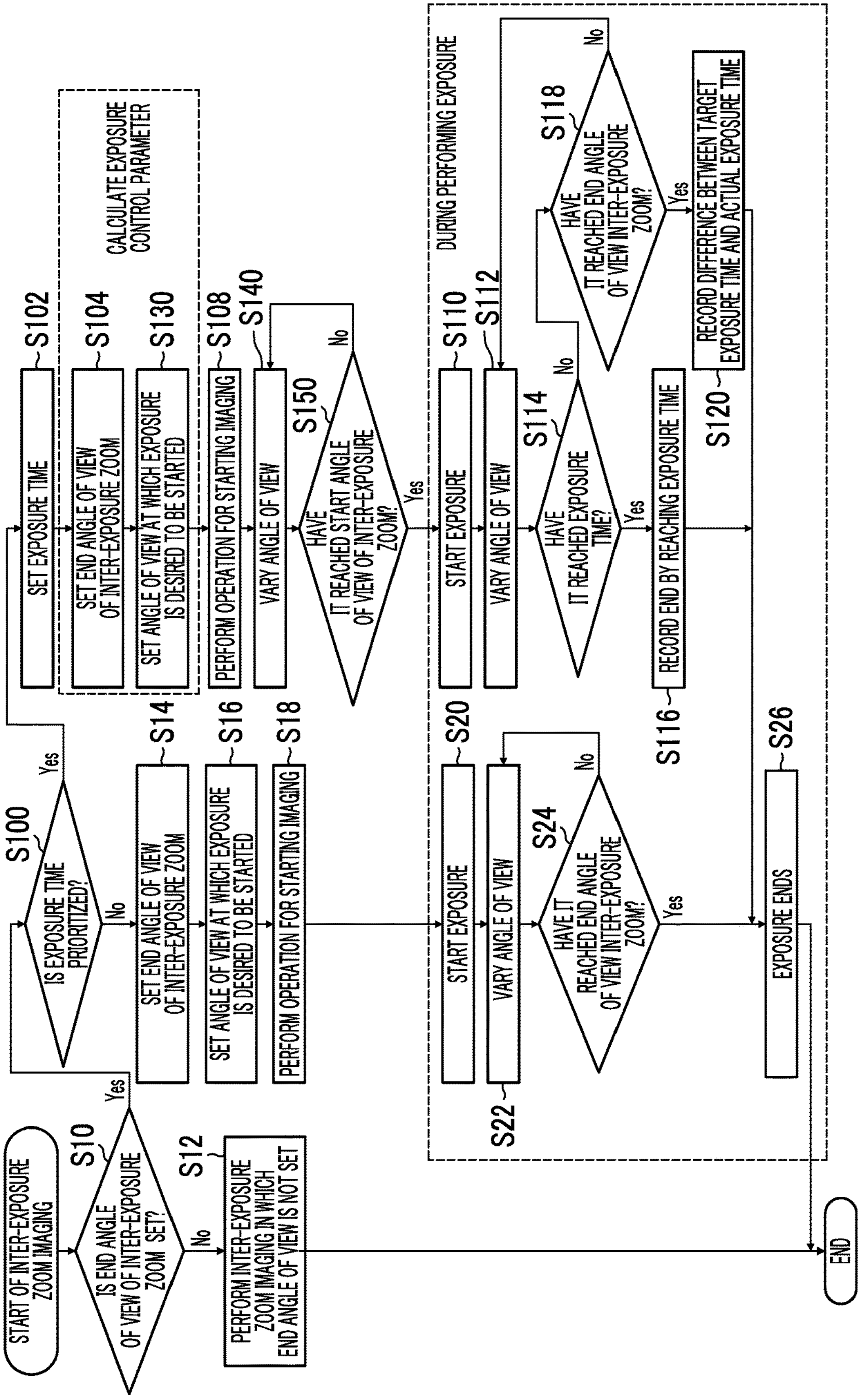
FIG. 12 is a flowchart showing a fifth embodiment of the inter-exposure zoom imaging method according to the present invention.

FIG. 12 is a flowchart showing a fifth embodiment of the inter-exposure zoom imaging method according to the embodiment of the present invention. In FIG. 12, the same step numbers are assigned to the steps common to the flowchart of the fourth embodiment of the inter-exposure zoom imaging method shown in FIG. 11, and detailed description thereof is omitted.

The fifth embodiment of the inter-exposure zoom imaging method shown in FIG. 12 is different from the fourth embodiment mainly in conditions for starting the inter-exposure zoom imaging.

That is, in the fifth embodiment of the inter-exposure zoom imaging method shown in FIG. 12, step S130 is executed instead of step S106 in the fourth embodiment, and steps S140 and S150 are added between step S108 and step S110 in the fourth embodiment.

In step S130, the "start angle of view" of the inter-exposure zoom imaging is set by the start angle of view setting unit. For setting the "start angle of view", for example, the zoom ring 106 is manually operated, the "start angle of view" is checked on the liquid crystal monitor 216, and then the "start angle of view" can be set by operating the MENU/OK key 27. This "start angle of view" acquires zoom position information indicating the zoom position of the zoom optical system 104 from the zoom position sensor 115 of the zoom lens 100, and can set the acquired zoom position information as the "start angle of view".

In addition, after setting the "start angle of view", the user performs the zooming operation of the zoom lens 100 to a wider angle side than the "start angle of view". In a case where the set "start angle of view" is a wide angle end of the zoom lens 100, the fifth embodiment is the same as the fourth embodiment.

Subsequently, the user operates the shutter release switch 22 (step S108), and manually operates the zoom ring 106 of the zoom lens 100 to vary the angle of view of the zoom lens 100 toward the "end angle of view" (step S140).

After receiving the imaging instruction from the shutter release switch 22, the main body side CPU 220 determines whether or not the angle of view of the zoom lens 100 has reached the "start angle of view" (step S150). Then, in a case where it is determined that the angle of view of the zoom lens 100 has reached the "start angle of view", the process proceeds to step S110, and the exposure of the inter-exposure zoom imaging is started.

As a result, the zooming operation of the zoom lens 100 can be performed at the desired angle of view variation speed from the "start angle of view" of the inter-exposure zoom imaging.

[Other]

The imaging apparatus according to the present embodiment is a mirrorless digital single-lens camera consisting of a zoom lens and a camera main body, but the present invention is not limited to this. The imaging apparatus is may be a single-lens reflex camera or an imaging apparatus in which the zoom lens is integrated with the camera main body, and in other words, any imaging apparatus may be used as long as an imaging apparatus comprising a zoom lens that is zoomed by a manual operation.

In addition, in the present embodiment, for example, the hardware structure of the processing unit that executes various processing such as the display controller 214, the main body side CPU 220, and the lens side CPU 120 is the following various processors (processor). The various processors include a central processing unit (CPU) which is a general-purpose processor that executes software (program) and functions as various processing units, a programmable logic device (PLD) which is a processor whose circuit configuration can be changed after manufacture such as a field programmable gate array (FPGA), and a dedicated electric circuit which is a processor having a circuit configuration specifically designed to execute specific processing such as an application specific integrated circuit (ASIC).

One processing unit may be configured by one of the various processors or by two or more processors of the same type or different types (for example, a plurality of FPGAs or a combination of a CPU and an FPGA). In addition, the plurality of processing units may be configured by one processor. As an example in which the plurality of processing units may be configured by one processor, there is a first example in which one processor is configured by a combination of one or more CPUs and software as represented by a computer such as a client and a server, and this processor functions as the plurality of processing units. Next, there is a second example in which a processor that implements the function of the entire system including the plurality of processing units by one integrated circuit (IC) chip is used, as represented by a system-on-chip (SoC) or the like. As such, various processing units are configured by using one or more of the various processors as a hardware structure.

In addition, specifically, the electric circuit (circuitry) obtained by combining circuit elements, such as semiconductor elements, can be used as the hardware structure of the various processors.

The present invention further includes a program installed in a computer within the imaging apparatus to function as the imaging apparatus according to the embodiment of the present invention, and a non-transitory computer-readable recording medium on which the program is recorded.

In addition, it is needless to say that the present invention is not limited to the above-described embodiment and various modifications can be made without departing from the spirit of the present invention.

EXPLANATION OF REFERENCES

10: imaging apparatus
22: shutter release switch
23: shutter speed dial
24: exposure correction dial
25: power supply lever
26: electronic viewfinder
27: MENU/OK key
28: cross key
29: play button
30: built-in flash
100: zoom lens
102: imaging optical system
104: zoom optical system
105: focus optical system
106: zoom ring
108: stop
115: zoom position sensor
116: focus lens driving unit
118: stop controller
120: lens side CPU
122: RAM
124: ROM
126: flash ROM
150: lens side communication unit
160: lens mount
200: camera main body
201: image sensor
202: image sensor controller
203: analog signal processing unit
204: converter
204: A/D converter
205: image input controller
206: digital signal processing unit
207: RAM
208: compression/expansion processing unit
210: media controller
212: memory card
214: display controller
216: liquid crystal monitor
220: main body side CPU
222: operation unit
226: flash ROM
228: ROM
230: AF controller
232: AE controller
234: white balance correction unit
236: wireless communication unit
238: GPS reception unit
240: power supply controller
242: battery
244: lens power switch
250: main body side communication unit
256: FPS controller
260: main body mount
260A: terminal
270: flash light emitting unit
272: flash controller
280: focal-plane shutter
296: FPS controller
360: lens mount
1230: AE controller
A: angle of view variation
AF: image plane phase difference
B: angle of view variation
C: angle of view variation
Cb: color difference data
Cr: color difference data
D: angle of view variation
E: target angle of view variation
Gr: WB gain
S10: step
S12: step
S14: step
S16: step
S18: step
S20: step
S22: step
S24: step
S26: step
S100: step
S102: step
S104: step
S106: step
S108: step
S110: step
S112: step
S114: step
S116: step
S118: step
S120: step
S130: step
S140: step
S150: step

What is claimed is:

1. An imaging apparatus comprising:

an user interface configured to set an imaging mode of inter-exposure zoom imaging and an end angle of view of the inter-exposure zoom imaging; and at least one processor configured to:

start exposure in an imaging element of the inter-exposure zoom imaging in a case where the imaging mode and the end angle of view of the inter-exposure zoom imaging are set and an imaging instruction is receive; and end the exposure in the imaging element of the inter-exposure zoom imaging at least in a case where an angle of view of a zoom lens zoomed by a manual operation reaches the set end angle of view, wherein the user interface is further configured to set a target exposure time in the inter-exposure zoom imaging and an exposure time priority mode in which an exposure time in the inter-exposure zoom imaging is prioritized over the end angle of view, and the at least one processor ends the exposure of the inter-exposure zoom imaging in a case where the exposure time priority mode is set and the exposure time in the inter-exposure zoom imaging reaches the target exposure time before the angle of view of the zoom lens zoomed by the manual operation reaches the end angle of view.

2. The imaging apparatus according to claim 1, wherein the at least one processor is further configured to:

set an exposure control parameter other than the target exposure time in a case where the inter-exposure zoom imaging is performed on the basis of the target exposure time set by the user interface and a brightness of a subject obtained at a start angle of view and the end angle of view of the inter-exposure zoom imaging; and control exposure during the inter-exposure zoom imaging with the set exposure control parameter.

3. The imaging apparatus according to claim 1, wherein the at least one processor is further configured to:

record an image captured by the inter-exposure zoom imaging on a recording medium, and record information indicating that the exposure of the inter-exposure zoom imaging ends before the angle of view of the zoom lens reaches the end angle of view on the recording medium in association with the image captured by the inter-exposure zoom imaging in a case where the exposure time in the inter-exposure zoom imaging reaches the target exposure time and the exposure of the inter-exposure zoom imaging ends before the angle of view of the zoom lens reaches the end angle of view.

4. The imaging apparatus according to claim 1, wherein the at least one processor is further configured to:

record an image captured by the inter-exposure zoom imaging on a recording medium; and record the target exposure time and an actual exposure time, a ratio of the target exposure time and the actual exposure time, or a difference between the target exposure time and the actual exposure time on the recording medium in association with the image captured by the inter-exposure zoom imaging in a case where the angle of view of the zoom lens reaches the end angle of view before the exposure time in the inter-exposure zoom imaging reaches the target exposure time, and the exposure of the inter-exposure zoom imaging ends.

5. The imaging apparatus according to claim 1, wherein the at least one processor is further configured to perform processing of multiplying an image captured by the inter-exposure zoom imaging by a gain which is determined by a ratio of the target exposure time and an actual exposure time or a difference between the target exposure time and the actual exposure time in a case where the angle of view of the zoom lens reaches the end angle of view before the exposure time in the inter-exposure zoom imaging reaches the target exposure time, and the exposure of the inter-exposure zoom imaging ends.

6. The imaging apparatus according to claim 1, further comprising a display, wherein the at least one processor is further configured to cause the display to display the information indicating that the exposure of the inter-exposure zoom imaging ends before the angle of view of the zoom lens reaches the end angle of view in the case where the exposure time in the inter-exposure zoom imaging reaches the target exposure time and the exposure of the inter-exposure zoom imaging ends before the angle of view of the zoom lens reaches the end angle of view.

7. An imaging apparatus comprising:

an user interface configured to set an imaging mode of inter-exposure zoom imaging and an end angle of view of the inter-exposure zoom imaging;

at least one processor configured to:

start exposure in an imaging element of the inter-exposure zoom imaging in a case where the imaging mode and the end angle of view of the inter-exposure zoom imaging are set and an imaging instruction is received; and end the exposure in the imaging element of the inter-exposure zoom imaging at least in a case where an angle of view of a zoom lens zoomed by a manual operation reaches the set end angle of view; and a display, wherein the user interface is further configured to set a target exposure time in the inter-exposure zoom imaging, and the at least one processor causes the display to display information indicating a relationship between a current exposure time with respect to the target exposure time and a current angle of view with respect to the end angle of view of the inter-exposure zoom imaging during the inter-exposure zoom imaging.

8. The imaging apparatus according to claim 7, wherein the at least one processor displays, on a screen of the display, a two-dimensional coordinate having a first axis indicating an elapsed time from an exposure start of the inter-exposure zoom imaging and a second axis indicating a change amount of the angle of view from a start angle of view of the inter-exposure zoom imaging and the target exposure time and the end angle of view on the two-dimensional coordinate and displays at least the current exposure time and the current angle of view on the two-dimensional coordinate.

9. The imaging apparatus according to claim 8, wherein the at least one processor further controls to display, on the two-dimensional coordinate displayed on the screen of the display, a graph indicating an ideal angle of view variation that causes the end angle of view in a state in which the target exposure time has elapsed.

10. The imaging apparatus according to claim 9, wherein the user interface is further configured to receive an instruction to deform a shape of the graph from a user, and the at least one processor changes the shape of the graph displayed on the screen of the display according to the instruction from the user interface.

11. An imaging apparatus comprising:

an user interface configured to set an imaging mode of inter-exposure zoom imaging and an end angle of view of the inter-exposure zoom imaging; and at least one processor configured to:

start exposure in an imaging element of the inter-exposure zoom imaging in a case where the imaging mode and the end angle of view of the inter-exposure zoom imaging are set and an imaging instruction is received; and end the exposure in the imaging element of the inter-exposure zoom imaging at least in a case where an angle of view of a zoom lens zoomed by a manual operation reaches the set end angle of view, wherein the at least one processor is further configured to receive the imaging instruction in association with the zoom operation of the zoom lens and starts the exposure of the inter-exposure zoom imaging, the user interface is further configured to set a start angle of view of the inter-exposure zoom imaging, and the at least one processor receives the imaging instruction by being triggered with the angle of view of the zoom lens that has reached the set start angle of view and starts the exposure of the inter-exposure zoom imaging.

12. The imaging apparatus according to claim 11, wherein the at least one processor is further configured to:

detect the zoom operation of the zoom lens;

receive the imaging instruction by being triggered with detection of the zoom operation; and start the exposure of the inter-exposure zoom imaging.

13. An inter-exposure zoom imaging method comprising:

a step of setting an imaging mode of inter-exposure zoom imaging by an user interface;

a step of setting an end angle of view of the inter-exposure zoom imaging by the user interface; and a step of starting exposure in an imaging element of the inter-exposure zoom imaging in a case where the imaging mode and the end angle of view of the inter-exposure zoom imaging are set and an imaging instruction is received, and ending the exposure in the imaging element of the inter-exposure zoom imaging at least in a case where an angle of view of a zoom lens zoomed by, a manual operation reaches the set end angle of view, by at least one processor, the method further comprising:

a step of setting a target exposure time in the inter-exposure zoom imaging by the user interface; and a step of setting an exposure time priority mode in which an exposure time in the inter-exposure zoom imaging is prioritized over the end angle of view, by the user interface, wherein in the step of ending the exposure, the exposure of the inter-exposure zoom imaging is ended in a case where the exposure time priority mode is set and the exposure time in the inter-exposure zoom imaging reaches the target exposure time before the angle of view of the zoom lens zoomed by the manual operation reaches the end angle of view.

14. The inter-exposure zoom imaging method according to claim 13, further comprising:

a step of recording an image captured by the inter-exposure zoom imaging on a recording medium, by the at least one processor, wherein in the step of recording, information indicating that the exposure in the inter-exposure zoom imaging ends before the angle of view of the zoom lens reaches the end angle of view is recorded on the recording medium in association with the image captured by the inter-exposure zoom imaging in a case where the exposure time in the inter-exposure zoom imaging reaches the target exposure time and the exposure in the inter-exposure zoom imaging ends before the angle of view of the zoom lens reaches the end angle of view.

15. The inter-exposure zoom imaging method according to claim 13, further comprising:

a step of causing a display to display the information indicating that the exposure of the inter-exposure zoom imaging ends before the angle of view reaches the end angle of view in the case where the exposure time in the inter-exposure zoom imaging reaches the target exposure time and the exposure of the inter-exposure zoom imaging ends before the angle of view of the zoom lens reaches the end angle of view, by the at least one processor.

16. The inter-exposure zoom imaging method according to claim 13, further comprising:

a step of setting a target exposure time in the inter-exposure zoom imaging, by the user interface, and a step of causing a display to display information indicating a relationship between a current exposure time with respect to the target exposure time and a current angle of view with respect to the end angle of view of the inter-exposure zoom imaging during the inter-exposure zoom imaging, by the at least one processor.

17. A non-transitory computer-readable recording medium that stores a program for causing a computer in an imaging apparatus to implement the inter-exposure zoom imaging method according to claim 13.

* * * * *